United States Patent
Hirao et al.

(10) Patent No.: US 11,358,432 B2
(45) Date of Patent: Jun. 14, 2022

(54) SUSPENSION CONTROL APPARATUS

(71) Applicant: Hitachi Astemo, Ltd., Ibaraki (JP)

(72) Inventors: Ryusuke Hirao, Kamagaya (JP); Nobuyuki Ichimaru, Yokohama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/277,538

(22) PCT Filed: Sep. 11, 2019

(86) PCT No.: PCT/JP2019/035700
§ 371 (c)(1),
(2) Date: Mar. 18, 2021

(87) PCT Pub. No.: WO2020/066624
PCT Pub. Date: Apr. 2, 2020

(65) Prior Publication Data
US 2022/0032720 A1 Feb. 3, 2022

(30) Foreign Application Priority Data
Sep. 25, 2018 (JP) .............................. JP2018-178769

(51) Int. Cl.
*B60G 17/016* (2006.01)
*B60G 17/08* (2006.01)
(Continued)

(52) U.S. Cl.
CPC .............. *B60G 17/08* (2013.01); *B60G 13/08* (2013.01); *B60G 17/018* (2013.01);
(Continued)

(58) Field of Classification Search
CPC ...... B60G 17/08; B60G 13/08; B60G 17/018; B60G 2202/24; B60G 2204/62;
(Continued)

(56) References Cited

U.S. PATENT DOCUMENTS

| 4,491,207 A | * | 1/1985 | Boonchanta | B60G 17/08 188/266.5 |
| 5,100,166 A | * | 3/1992 | Mitsui | B60G 17/018 188/290 |

(Continued)

FOREIGN PATENT DOCUMENTS

| EP | 1 355 083 | 10/2003 |
| JP | 10-2368 | 1/1998 |

(Continued)

OTHER PUBLICATIONS

International Search Report dated Nov. 19, 2019 in International (PCT) Application No. PCT/JP2019/035700 with English translation.

(Continued)

*Primary Examiner* — Toan C To
(74) *Attorney, Agent, or Firm* — Wenderoth, Lind & Ponack, L.L.P.

(57) ABSTRACT

Provided a suspension control apparatus including a vehicle behavior detection unit (acceleration sensors), an electrorheological damper provided between a vehicle body (1) and each wheel (2), and a controller configured to execute control so that a damping force of each electrorheological damper is adjusted based on a detection result obtained by the vehicle behavior detection unit. The controller includes a target voltage value setting unit (damping force command calculation unit) configured to obtain a target voltage value to be applied to an electrode tube based on the detection result obtained by the vehicle behavior detection unit, a temperature estimation unit configured to detect or estimate temperature of ERF, and a target voltage value correction unit (output limiting unit) configured to change the target voltage value so that a piston speed (V) is adjusted based on a value obtained by the temperature estimation unit.

10 Claims, 12 Drawing Sheets

(51) Int. Cl.
  B60G 13/08 (2006.01)
  B60G 17/018 (2006.01)
  *F16F 9/53* (2006.01)

(52) U.S. Cl.
  CPC ...... *B60G 2202/24* (2013.01); *B60G 2204/62* (2013.01); *B60G 2206/41* (2013.01); *B60G 2400/202* (2013.01); *B60G 2400/204* (2013.01); *B60G 2400/206* (2013.01); *B60G 2500/104* (2013.01); *B60G 2600/182* (2013.01); *B60G 2800/162* (2013.01); *B60G 2800/916* (2013.01); *F16F 9/532* (2013.01)

(58) Field of Classification Search
  CPC .......... B60G 2206/41; B60G 2400/202; B60G 2400/204; B60G 2400/206; B60G 2500/104; B60G 2600/182; B60G 2800/162; B60G 2800/916; F16F 9/532
  See application file for complete search history.

(56) References Cited

U.S. PATENT DOCUMENTS

| | | | | |
|---|---|---|---|---|
| 5,123,671 | A * | 6/1992 | Driessen | B60G 17/018 188/266.8 |
| 9,682,602 | B2 * | 6/2017 | Morita | B60G 17/015 |
| 9,702,349 | B2 * | 7/2017 | Anderson | B60G 17/052 |
| 10,328,761 | B2 * | 6/2019 | Sugimoto | B60G 17/018 |
| 10,369,858 | B2 * | 8/2019 | Morita | B60G 17/018 |
| 11,104,198 | B2 * | 8/2021 | Yamahata | F16F 9/532 |
| 2008/0004770 | A1 * | 1/2008 | Masamura | B60G 17/018 701/37 |
| 2015/0224845 | A1 * | 8/2015 | Anderson | B60G 17/052 701/37 |
| 2018/0319241 | A1 | 11/2018 | Hirao et al. | |
| 2018/0320751 | A1 | 11/2018 | Kadokura et al. | |
| 2020/0406699 | A1 * | 12/2020 | Yamahata | B60G 17/08 |

FOREIGN PATENT DOCUMENTS

| | | |
|---|---|---|
| JP | 10-119529 | 5/1998 |
| JP | 2017-015244 | 1/2017 |
| WO | 2017/002620 | 1/2017 |

OTHER PUBLICATIONS

Written Opinion of the International Searching Authority dated Nov. 19, 2019 in International (PCT) Application No. PCT/JP2019/035700 with English translation.
Office Action dated Feb. 21, 2022 in corresponding German Patent Application No. 11 2019 004 783.3, with English translation.

* cited by examiner

_US 11,358,432 B2_

SUSPENSION CONTROL APPARATUS

TECHNICAL FIELD

The present invention relates to a suspension control apparatus to be installed in a vehicle, for example, a four-wheeled vehicle.

BACKGROUND ART

In a vehicle represented by a four-wheeled vehicle, a shock absorber (damper) is provided between a vehicle body (sprung) side and each wheel (unsprung) side of the vehicle. Among the shock absorbers of this type, there has been known an electrorheological damper which uses electrorheological fluid as working fluid sealingly contained in a cylinder, and is configured to increase or reduce an electric field to be applied to the electrorheological fluid, to thereby variably adjust a generated damping force (see Patent Literature 1 and Patent Literature 2).

CITATION LIST

Patent Literature

PTL 1: JP 10-2368 A
PTL 2: JP 10-119529 A

SUMMARY OF INVENTION

Technical Problem

Incidentally, functional fluid represented by the electrorheological fluid has characteristics including viscosity that greatly changes under influence of an ambient temperature. For example, the functional fluid in a low-temperature state presents excessively high viscosity, and the adjustment of the damping force is thus difficult. Moreover, the functional fluid at high temperature not only presents excessively low viscosity, but there also occurs a problem of overheat caused by the temperature increase.

Solution to Problem

The present invention has an object to provide a suspension control apparatus configured to control functional fluid so that the functional fluid has an appropriate temperature, thereby being capable of suppressing a decrease in performance and suppressing overheat.

According to one embodiment of the present invention, there is provided a suspension control apparatus including: a vehicle behavior detection unit configured to detect a behavior of a vehicle; a damping force adjustable shock absorber provided between two members of the vehicle, the two members being configured to move relative to each other; and a controller configured to execute control so that a damping force of the damping force adjustable shock absorber is adjusted based on a detection result obtained by the vehicle behavior detection unit, wherein the damping force adjustable shock absorber includes: a cylinder which sealingly contains functional fluid having a fluid property to be changed by an electric field or a magnetic field; a piston which is inserted into the cylinder to be slidable; a piston rod which is coupled to the piston, and extends to an outside of the cylinder; and an electrode which is provided in a portion at which a flow of the functional fluid is generated by the slide of the piston in the cylinder, and is configured to apply the electric field or the magnetic field to the functional fluid, and wherein the controller includes: a target voltage value setting unit configured to obtain a target voltage value to be applied to the electrode based on the detection result obtained by the vehicle behavior detection unit; a temperature estimation unit configured to detect or estimate temperature of the functional fluid; and a target voltage value correction unit configured to change the target voltage value so that a piston speed is adjusted based on a value obtained by the temperature estimation unit.

According to one embodiment of the present invention, it is possible to control the functional fluid so that the functional fluid has an appropriate temperature, thereby being capable of suppressing a decrease in performance of the damping force adjustable shock absorber and suppressing overheat.

DESCRIPTION OF EMBODIMENTS

With reference to the accompanying drawings, description is now given of a suspension control apparatus according to each embodiment of the present invention while exemplifying a case in which this suspension control apparatus is mounted to a four-wheeled vehicle serving as a vehicle.

Figure 1:
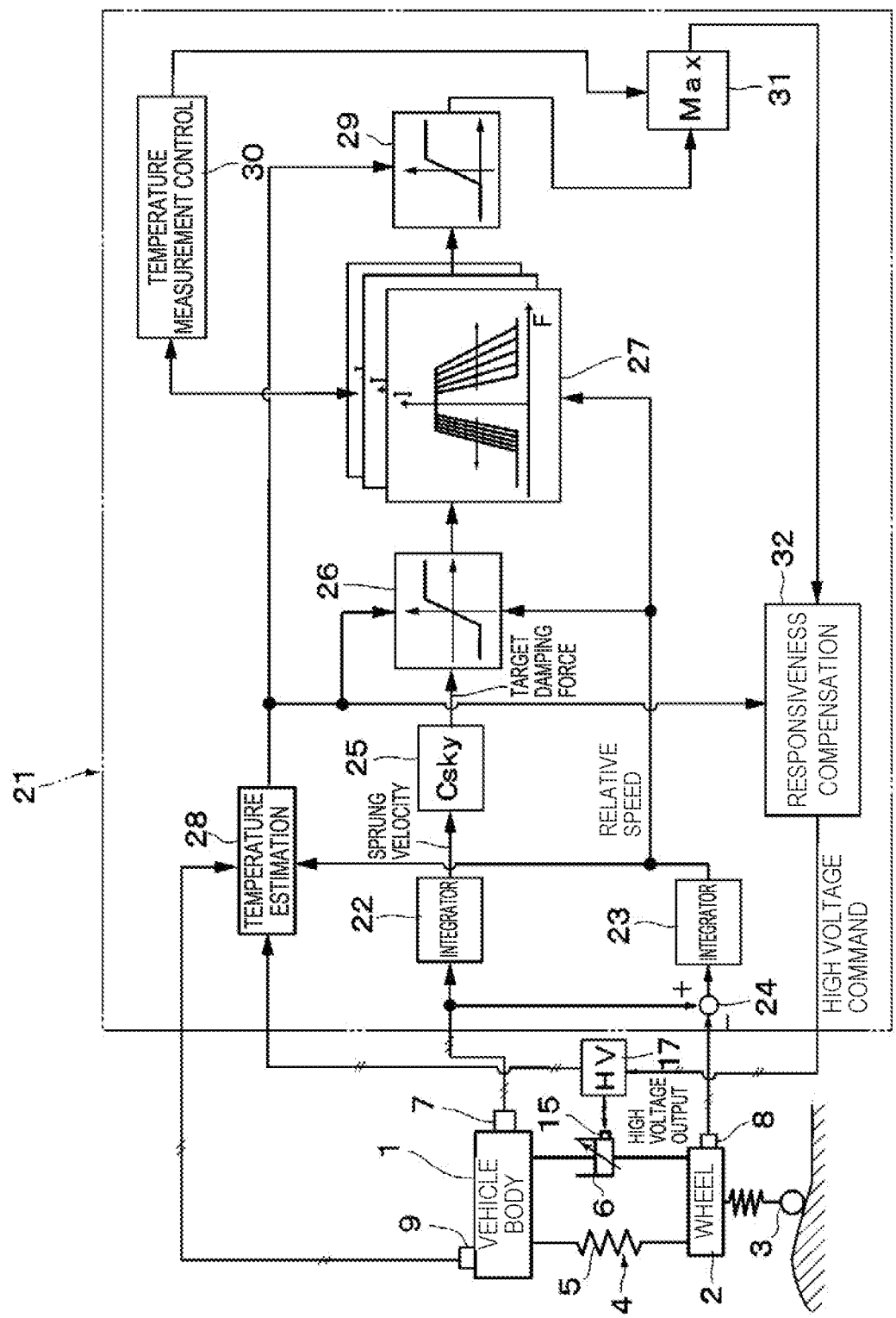
FIG. 1 is a control block diagram for illustrating an overall configuration of a suspension control apparatus according to a first embodiment of the present invention.

FIG. 1 to FIG. 7 are each an illustration of a first embodiment of the present invention. In FIG. 1, a vehicle body 1 constructs a body of the four-wheeled vehicle (vehicle). On a bottom side of the vehicle body 1, wheels 2 constructing the vehicle together with the vehicle body 1 (for example, left and right front wheels and left and right rear wheels) are provided. The wheels 2 each include a tire 3, and the tire 3 serves as a spring configured to absorb small recesses and protrusions on a road surface.

A suspension device 4 is provided between the vehicle body 1 and the wheel 2, which construct two members of the vehicle configured to move relative to each other. The suspension device 4 is constructed of a suspension spring 5 (hereinafter referred to as "spring 5"), and a damping force adjustable shock absorber (hereinafter referred to as "electrorheological damper 6") provided in parallel to the spring 5 between the vehicle body 1 and the wheel 2, which construct the two members. In FIG. 1, a case in which one suspension device 4 is provided between the vehicle body 1 and the wheel 2 is exemplified. However, for example, a total of four suspension devices 4 are individually and independently provided between the four wheels 2 and the vehicle body 1, and only one of the suspension devices 4 is schematically illustrated in FIG. 1.

A sprung acceleration sensor 7 provided on the vehicle body 1 side is mounted to, for example, a predetermined position of the vehicle body 1 close to the electrorheological damper 6. The sprung acceleration sensor 7 is configured to detect a vibration acceleration in a vertical direction on a sprung (that is, the vehicle body 1) side, and to output a detection signal thereof to a controller 21. Meanwhile, an unsprung acceleration sensor 8 is provided on the wheel 2 side of the vehicle. The unsprung acceleration sensor 8 is configured to detect a vibration acceleration in the vertical direction on an unsprung (that is, the wheel 2) side, and to output a detection signal thereof (that is, an unsprung acceleration) to the controller 21.

In this configuration, the sprung acceleration sensor 7 and the unsprung acceleration sensor 8 constitute a vehicle behavior detection unit configured to detect a behavior of the vehicle. The vehicle behavior detection unit is not limited to the sprung acceleration sensor 7 and the unsprung acceleration sensor 8 which are provided close to the electrorheological damper 6. The vehicle behavior detection unit may be constituted by, for example, only the sprung acceleration sensor 7, or may be constituted by a vehicle height sensor (not shown). Further, the vehicle behavior detection unit may be constituted by, for example, a wheel speed sensor (not shown) configured to detect a rotation speed of the wheel 2, or may be constituted by a vehicle behavior detection sensor which is other than the acceleration sensors 7 and 8 and the vehicle height sensor, and is configured to detect a behavior (state quantity) of the vehicle. In this case, for example, a vertical motion of the vehicle may be detected by estimating the vertical motion of each wheel 2 from information (acceleration) of the one sprung acceleration sensor 7 and information (wheel speed) of the wheel speed sensor.

Figure 3:
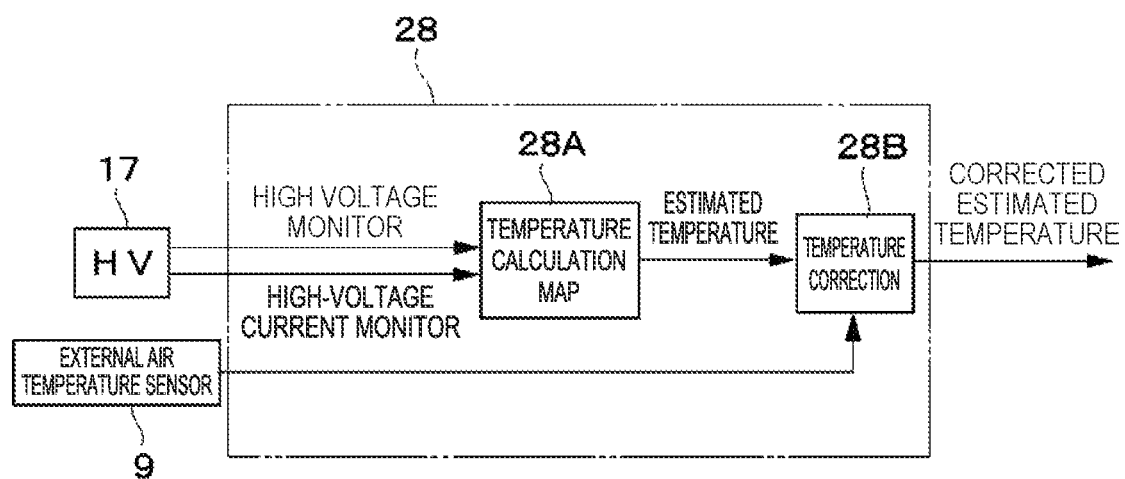
FIG. 3 is a control block diagram for specifically illustrating a temperature estimation unit of FIG. 1.

An external air temperature sensor 9 configured to detect an ambient temperature is provided on the vehicle body 1. The external air temperature sensor 9 detects, for example, the ambient temperature of the vehicle body 1, and outputs a detection signal thereof to the controller 21. As illustrated in FIG. 3, a temperature estimation unit 28 of the controller 21 can estimate and calculate a temperature state of an electrorheological fluid 10 based on the detection signal output from the external air temperature sensor 9 as described below.

Figure 2:
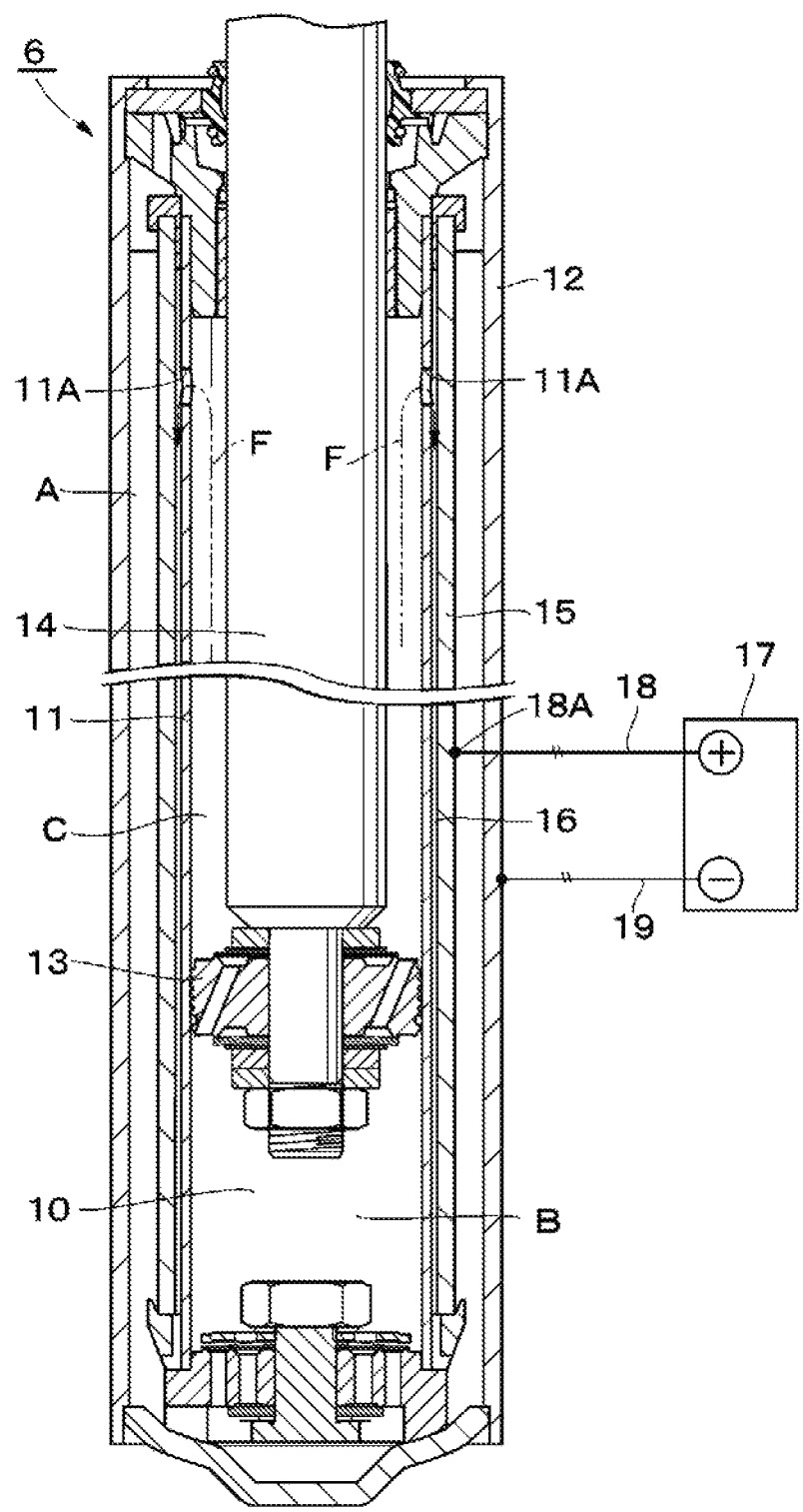
FIG. 2 is a longitudinal sectional view for specifically illustrating an electrorheological damper of FIG. 1.

With reference to FIG. 2, description is now given of a specific configuration of the electrorheological damper 6. The electrorheological damper 6 of the suspension device 4 is configured to attenuate a vertical movement of the wheel 2. The electrorheological damper 6 uses the electrorheological fluid 10 as working fluid (functional fluid) to be sealingly contained inside, and operates as a damping force adjustable shock absorber (semi-active damper).

As illustrated in FIG. 2, the electrorheological damper 6 includes an inner tube 11, an outer tube 12, a piston 13, a piston rod 14, and an electrode tube 15. The inner tube 11 and the outer tube 12 serve as a cylinder sealingly containing the electrorheological fluid 10 (hereinafter referred to as "ERF 10"). The piston 13 is inserted into the inner tube 11 so as to be slidable. The piston rod 14 is coupled to the piston 13, and extends to the outside of the inner tube 11 and the outer tube 12. The electrode tube 15 is provided in a portion through which the ERF 10 flows by the slide of the piston 13 in the inner tube 11, and serves as an electrode configured to apply an electric field to the ERF 10. A high voltage is applied to the electrode tube 15 through intermediation of an electrode pin 18A described below in accordance with a voltage command.

In the b damper 6, an annular reservoir chamber A is formed between the inner tube 11 and the outer tube 12. In the reservoir chamber A, gas is sealingly contained together with the working fluid (ERF 10). Moreover, the inside of the inner tube 11 is partitioned into two chambers (that is, a bottom-side oil chamber B and a rod-side oil chamber C) by the piston 13. An annular electrode passage 16 is formed between the inner tube 11 and the electrode tube 15. The electrode passage 16 is a liquid passage through which the ERF 10 in the rod-side oil chamber C communicates from oil holes 11A in the inner tube 11 toward the reservoir chamber A. A flow of the ERF 10 is generated by the slide of the piston 13 in the electrode passage 16.

The ERF 10 is functional fluid having a characteristic to be changed in accordance with an electric field (voltage). The ERF 10 is formed of, for example, base oil made of silicon oil or the like, and particles (particulates). The particles are mixed with (dispersed in) the base oil, and have viscosity to be changed in accordance with a change in electric field. As a result, the viscosity (degree of viscosity) of the ERF 10 changes in accordance with the applied voltage, and a flow resistance (damping force) is consequently increased and reduced. That is, the electrorheological damper 6 can continuously adjust a characteristic of a generated damping force (damping force characteristic) from a hard characteristic to a soft characteristic in accordance with the voltage applied to the electrode tube 15 provided in the portion through which the flow of the ERF 10 is generated. The electrorheological damper 6 may be configured to be able to adjust the damping force characteristic not continuously but at two levels or a plurality of levels.

The electrorheological damper 6 illustrated in FIG. 2 has a uniflow structure. Consequently, the ERF 10 in the inner tube 11 always flows in one direction (namely, a direction of arrows F indicated by two-dot chains of FIG. 2) from the oil holes 11A of the inner tube 11 toward the reservoir chamber A through intermediation of the electrode passage 16 in both strokes being a compression stroke and an extension stroke of the piston rod 14. In this case, the electrode tube 15 being an intermediate tube surrounds an outer peripheral side of the inner tube 11 across an entire circumference, to thereby form the annular electrode passage 16 between the outer peripheral side of the inner tube 11 and an inner peripheral side of the electrode tube 15.

When the piston 13 is axially slid and displaced in the inner tube 11 (that is, the piston rod 14 moves forward and backward in such a manner as to repeat the compression stroke and the extension stroke), the ERF 10 in the electrode passage 16 flows from an upper side toward a lower side in the axial direction of the electrode passage 16 as a result of the forward and backward movement. Under this state, an electric potential difference is generated in the electrode passage 16 in accordance with the voltage applied to the electrode tube 15. The degree of viscosity of the ERF 10 is changed by this electric potential difference. In other words, the electrorheological damper 6 generates the electric potential difference in the electrode passage 16 between the inner tube 11 and the electrode tube 15 to variably control the decree of viscosity of the ERF 10 passing through the electrode passage 16, to thereby be able to adjust the generated damping force.

A high voltage driver 17 is a device configured to generate a high voltage to be applied to the ERF 10 of the electrorheological damper 6. Thus, the high voltage driver 17 is connected to an output side of the controller 21, and is also connected to a battery (not shown) being a power supply. Simultaneously, the high voltage driver 17 is connected to the electrorheological damper 6 (the electrode tube 15 and the outer tube 12 forming a damper shell) through intermediation of a high voltage output line 18 and a ground line 19 constituting (high voltage) DC power lines. The electrode pin 18A configured to apply the voltage (high voltage) to the electrode tube 15 is provided on a distal end side of the high voltage output line 18.

In FIG. 2, the high voltage driver 17 is illustrated under a state in which the high voltage driver 17 is radially apart from the outer tube 12 of the electrorheological damper 6 in order to clearly illustrate the high-voltage output line 18 and the ground line 19. However, the high voltage driver 17 is actually formed with a box structure, and is fixed to the outer peripheral surface of the outer tube 12 under an abutment state. As a result, when the ERF 10 in the electrorheological damper 6 is brought into the high temperature state, the high voltage driver 17 directly receives thermal influence of this state through intermediation of the outer tube 12.

The high voltage driver 17 includes a microcomputer, a booster circuit, and a current detection circuit (none of those components are shown). The high voltage driver 17 boosts the DC voltage output from the battery based on a command (high voltage command) output from the controller 21 through intermediation of a responsiveness compensation unit 32, and applies the high voltage obtained through the boosting to the electrode tube 15 of the electrorheological damper 6. Moreover, the high voltage driver 17 monitors a current supplied to the electrorheological damper 6, that is, a current boosted by the high voltage driver 17, and outputs a monitor signal of the current (high-voltage current monitor signal) as a high-voltage current monitor value (high-voltage current value) to the temperature estimation unit 28 of the controller 21 (see FIG. 3).

The controller 21 is also referred to as an electronic control unit (ECU) for the suspension device, and includes, for example, a microcomputer. As illustrated in FIG. 1, for example, the controller 21 is connected to the acceleration sensors 7 and 8 and the high voltage driver 17 through communication lines, for example, a controller area network (CAN), which is a network required for data communication. The controller 21 carries out control of adjusting the damping force of the electrorheological damper 6 based on the detection results obtained by the sprung acceleration sensor 7 and the unsprung acceleration sensor 8. In other words, the controller 21 calculates the command to be output to the high voltage driver 17 (namely, a high voltage command value) from the information acquired from the sprung acceleration sensor 7 and the unsprung acceleration sensor 8 based on calculation processing described later, to thereby control the electrorheological damper 6, which is a variable-damping-force damper.

The controller 21 receives input of, for example, the high-voltage current monitor signal output from the high voltage driver 17 in addition to the sprung acceleration signal output from the sprung acceleration sensor 7 and the unsprung acceleration signal output from the unsprung acceleration sensor 8. The controller 21 calculates the high voltage command corresponding to the force (damping force) to be output in the electrorheological damper 6 based on the sprung acceleration signal and the unsprung acceleration signal serving as behavior information (vehicle behavior signal) on the vehicle and on the high-voltage current monitor signal serving as power information (shock absorber power signal) on the electrorheological damper 6.

The controller 21 outputs the calculated high voltage command (high voltage command signal) to the high voltage driver 17. The high voltage driver 17 outputs, based on the high voltage command output from the controller 21, a high voltage corresponding to the command to the electrode tube 15 of the electrorheological damper 6. In the electrorheological damper 6 that has received input of the high voltage, the viscosity of the ERF 10 changes in accordance with a change in voltage value (electric potential difference between the electrode tube 15 and the inner tube 11), to thereby be able to switch (adjust) the damping force characteristic of the electrorheological damper 6.

As illustrated in FIG. 1, the controller 21 includes integrators 22 and 23, a subtractor 24, a target damping force calculation unit 25, a damping force limiting unit 26, a damping force command calculation unit 27, the temperature estimation unit 28, an output limiting unit 29, a temperature measurement control unit 30, a maximum value selection unit 31, and the responsiveness compensation unit 32. The integrator 22 of the controller 21 integrates the detection signal output from the sprung acceleration sensor 7, to thereby calculate a sprung speed being a vertical speed of the vehicle body 1.

The subtractor 24 executes subtraction processing between the detection signal output from the sprung acceleration sensor 7 and the detection signal output from the unsprung acceleration sensor 8, to thereby calculate a difference between the sprung acceleration and the unsprung acceleration. The difference value corresponds to a relative acceleration between the body 1 (sprung side) and the wheel 2 (unsprung side). The integrator 23 integrates the difference value (relative acceleration) output from the subtractor 24, to thereby calculate a relative speed between the sprung side and the unsprung side of the electrorheological damper 6 (that is, a relative speed in the vertical direction between the vehicle body 1 and the wheel 2). The relative speed corresponds to a displacement speed of the piston 13 (that is, a piston speed V) described below.

The target damping force calculation unit 25 outputs a target damping force to be generated in the electrorheological damper 6 based on the sprung speed output from the integrator 22. The target damping force is obtained through, for example, skyhook control theory. That is, the target damping force calculation unit 25 multiplies a skyhook damping coefficient Csky obtained through the skyhook control theory and the sprung speed by each other, to thereby calculate the target damping force. A control law for calculating the target damping force is not limited to the skyhook control, and feedback control, for example, optimal control or H∞ control, can be used. Moreover, the target damping force is used as the control command, but a target damping coefficient may be used.

The damping force limiting unit 26 limits a positive value and a negative value of the maximum value of the target damping force so that the positive value and the negative value are limited independently of each other. The damping force limiting unit 26 limits the maximum value of the target damping force based on a corrected estimated temperature (see FIG. 3) of the ERF 10 estimated and calculated by the temperature estimation unit 28 described below and the relative speed between the vehicle body 1 and the wheel 2 in the vertical direction, to thereby suppress generation of an excessive damping force in the electrorheological damper 6.

The damping force command calculation unit 27 includes an F-I map (command map of the relative speed, the temperature, a damping force F, and a current value I) in which a target relationship between the damping force F and the current value I is variably set in accordance with the relative speed and the corrected estimated temperature as a command map illustrated in FIG. 1. The damping force command calculation unit 27 is used to calculate a command value as a high voltage command to be output to the electrode tube 15 of the electrorheological damper 6 based on a signal (signal of the damping force) output from the damping force limiting unit 26, the signal (relative speed) output from the integrator 23, and the corrected estimated temperature output from the temperature estimation unit 28.

The command map of the damping force command calculation unit 27 is obtained through experiments, simulation, or the like in advance as a map corresponding to the relationship (characteristic) among the target damping force, the relative speed, the temperature, and the command voltage to be applied, and is set to (stored in) the damping force command calculation unit 27. The damping force command calculation unit 27 calculates the command value as the high voltage command in consideration of the estimated temperature (damper temperature) of the ERF 10 at the time. As a result, the high voltage command value calculated by the damping force command calculation unit 27 can be set to a value corresponding to the temperature of the ERF 10 at the time.

The damping force command calculation unit 27 constitutes a target voltage value setting unit configured to obtain a target voltage value (voltage command value) to be applied to the electrode tube 15 based on the detection result obtained by the vehicle behavior detection unit (for example, the sprung acceleration sensor 7 and the unsprung acceleration sensor 8). In the damping force command calculation unit 27 employed in this embodiment, the map is used to calculate the high voltage command value, but the representation of the relationship is not limited to the map, and, for example, a calculation expression (function) or an array corresponding to the relationship (characteristic) among the target damping force, the relative speed, the temperature, and the command voltage may be used.

The temperature estimation unit 28 is a temperature estimation unit configured to obtain the temperature of the ERF 10 through the estimation and calculation. As illustrated in FIG. 3, a high voltage monitor signal and a high-voltage current monitor signal output from the high voltage driver 17 and the detection signal (external air temperature information) output from the external air temperature sensor 9 are input to the temperature estimation unit 28. The temperature estimation unit 28 includes a temperature calculation map unit 28A and a temperature correction unit 29B. The temperature calculation map unit 28A obtains an electric resistance value of the ERF 10 based on the high voltage monitor signal and the high-voltage current monitor signal output from the high voltage driver 17, and calculates the estimated temperature of the ERF 10 from the resistance value.

The temperature correction unit 28B calculates the corrected estimated temperature of the ERF 10 based on the estimated temperature output from the temperature calculation map unit 28A and the signal (external air temperature) output from the external air temperature sensor 9. When the external air temperature and/or the temperature of the ERF 10 is low, and the current value of the high-voltage current monitor signal is extremely small, the temperature estimation by the temperature calculation map unit 28A is difficult. To deal with this problem, the temperature correction unit 28B uses the detection value (external air temperature) of the external air temperature sensor 9 as the corrected estimated temperature until the estimated temperature becomes equal to or higher a certain value. The temperature correction unit 28B gradually changes a weight for the estimated temperature in accordance with the estimated temperature when the estimated temperature is equal to or higher than the certain value, to thereby smoothly switch the corrected estimated temperature from the external air temperature to the estimated temperature.

Figure 4:
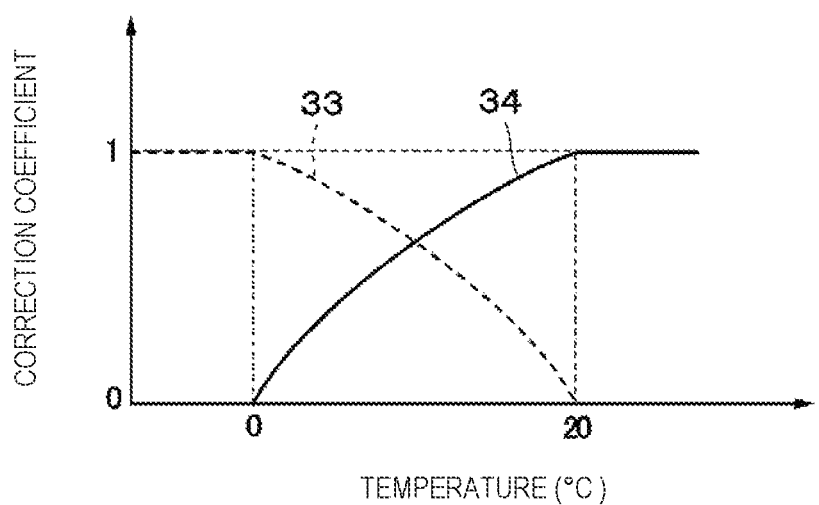
FIG. 4 is a characteristic line graph for showing a calculation map for correction coefficients in a temperature correction unit of FIG. 3.

A characteristic line 33 represented by the dotted line of FIG. 4 indicates a characteristic of a correction coefficient for the external air temperature. When the external air temperature is an extremely low temperature equal to or lower than 0° C. (below freezing point), the correction coefficient is set to "1." The correction coefficient is set so as to gradually decrease from "1" to "0" when the external air temperature is between 0° C. to 20° C. Meanwhile, a characteristic line 34 represented by the solid line of FIG. 4 indicates a characteristic of a correction coefficient for the estimated temperature output from the temperature calculation map unit 28A. When the external air temperature is an extremely low temperature equal to or lower than 0° C. (below the freezing point), the correction coefficient is set to "0." The correction coefficient is set so as to gradually increase from "0" to "1" when the external air temperature is between 0° C. to 20° C.

As described above, the temperature correction unit 28B of the temperature estimation unit 28 multiplies the detection value (external air temperature) of the external air temperature sensor 9 and the estimated temperature of the temperature calculation map unit 28A by the correction coefficients indicated by the characteristic lines 33 and 34, respectively, and obtains the temperature (corrected estimated temperature illustrated in FIG. 3) of the ERF 10 based on the multiplication results.

After that, the output limiting unit 29 applies a limit to the voltage command value output from the damping force command calculation unit 27 based on the corrected estimated temperature output from the temperature estimation unit 28, to thereby calculate a voltage command value having the output limit. That is, the output limiting unit 29 applies the limit in accordance with an output limit map given by, for example, characteristic lines 35 and 36 of FIG. 6 to the input command based on the corrected estimated temperature (that is, the estimated damper temperature) output from the temperature estimation unit 28, to thereby calculate the voltage command value having the output limit. The output limiting unit 29 adjusts the piston speed V (that is, the relative speed illustrated in FIG. 1) based on the damper temperature estimated by the temperature estimation unit 28 (temperature estimation unit), and thus constitutes a target voltage value correction unit configured to change the target voltage value.

Figure 5:
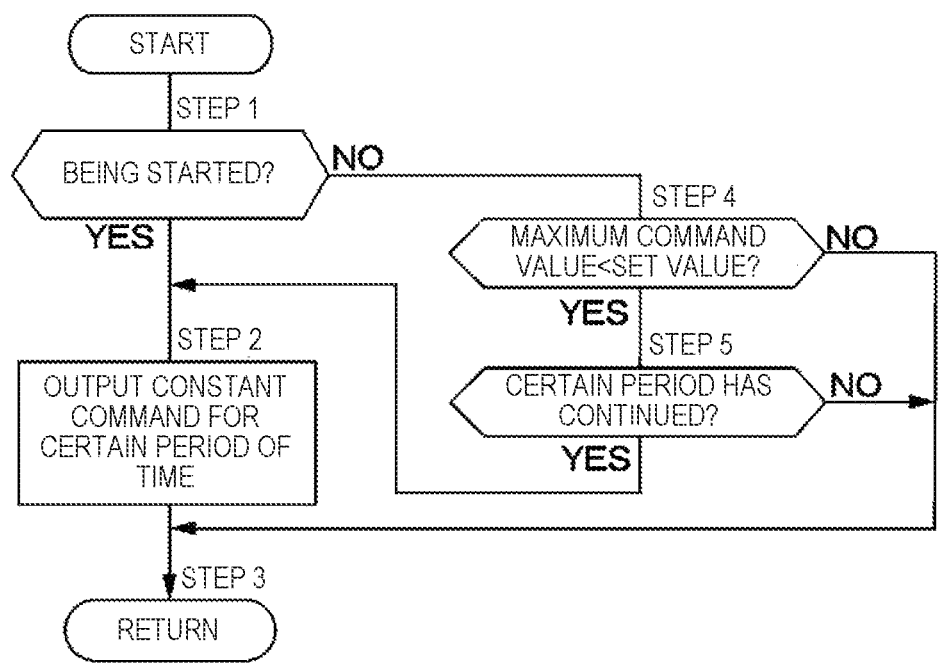
FIG. 5 is a flowchart for illustrating control processing by a temperature measurement control unit of FIG. 1.

The temperature measurement control unit 30 is a control unit configured to output a constant pseudo command to the high voltage driver 17, for example, when the engine is being started, or the high voltage command has been equal to or smaller than a set value for a certain period of time. FIG. 5 is a flowchart for illustrating an example of control processing by the temperature measurement control unit 30.

That is, when the control processing of FIG. 5 starts, the temperature measurement control unit 30 determines whether or not the engine is being started in Step 1. When the temperature measurement control unit 30 makes a determination of "YES" in Step 1, the engine is being started. Thus, the voltage has not been applied even once, and hence the temperature estimation unit 28 cannot estimate and calculate the temperature of the ERF 10. Accordingly, in Step 2, the constant command (pseudo signal of the high voltage command) is output for a certain period of time. As a result, the pseudo voltage command is output from the temperature measurement control unit 30 to the high voltage driver 17 through intermediation of the maximum value selection unit 31. As a result, as illustrated in FIG. 3, the temperature correction unit 28B of the temperature estimation unit 28 can receive the high voltage monitor signal and the high-voltage current monitor signal from the high voltage driver 17, and the current is detected. Thus, the temperature can be estimated.

Meanwhile, when the temperature measurement control unit 30 makes a determination of "NO" in Step 1, the engine has been started. Thus, the vehicle is in a state in which the vehicle can travel, and it is determined whether or not a maximum command value has been smaller than the set value for the certain period of time in the next Steps 4 and 5. When the temperature measurement control unit 30 makes a determination of "NO" in Step 4 or Step 5, the state in which the maximum command value is smaller than the set value has not continued for the certain period of time. Thus, the pseudo signal is not output, and the control processing returns in Step 3.

Figure 6:
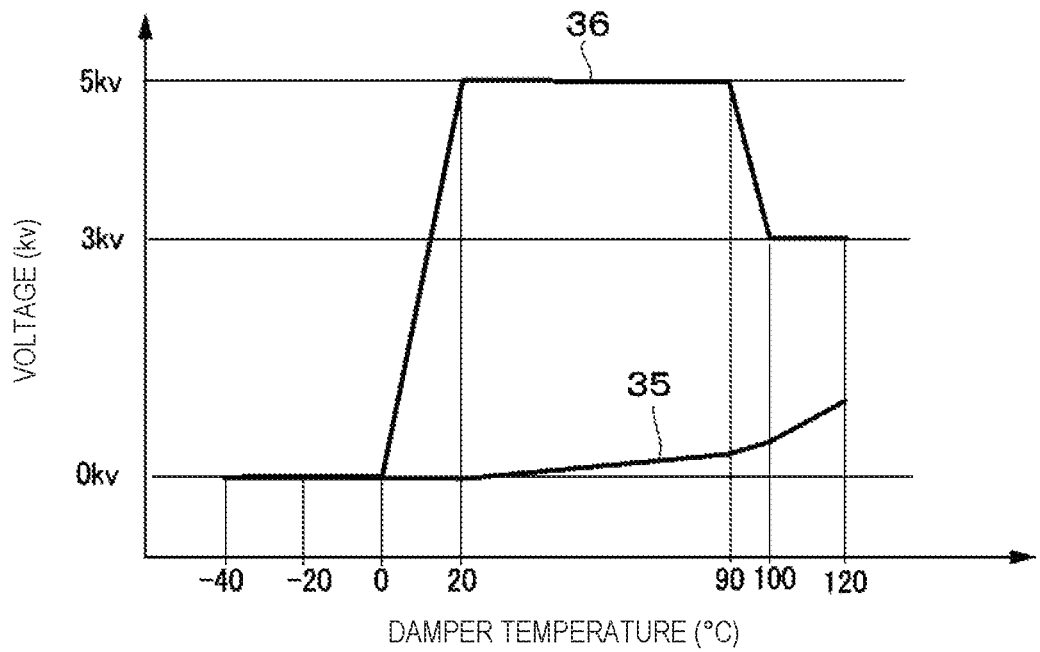
FIG. 6 is a characteristic line graph for showing characteristics of a lowest voltage command limit value and a highest voltage command limit value for limiting output in accordance with a damper temperature in an output limiting unit of FIG. 1.
Figure 7:
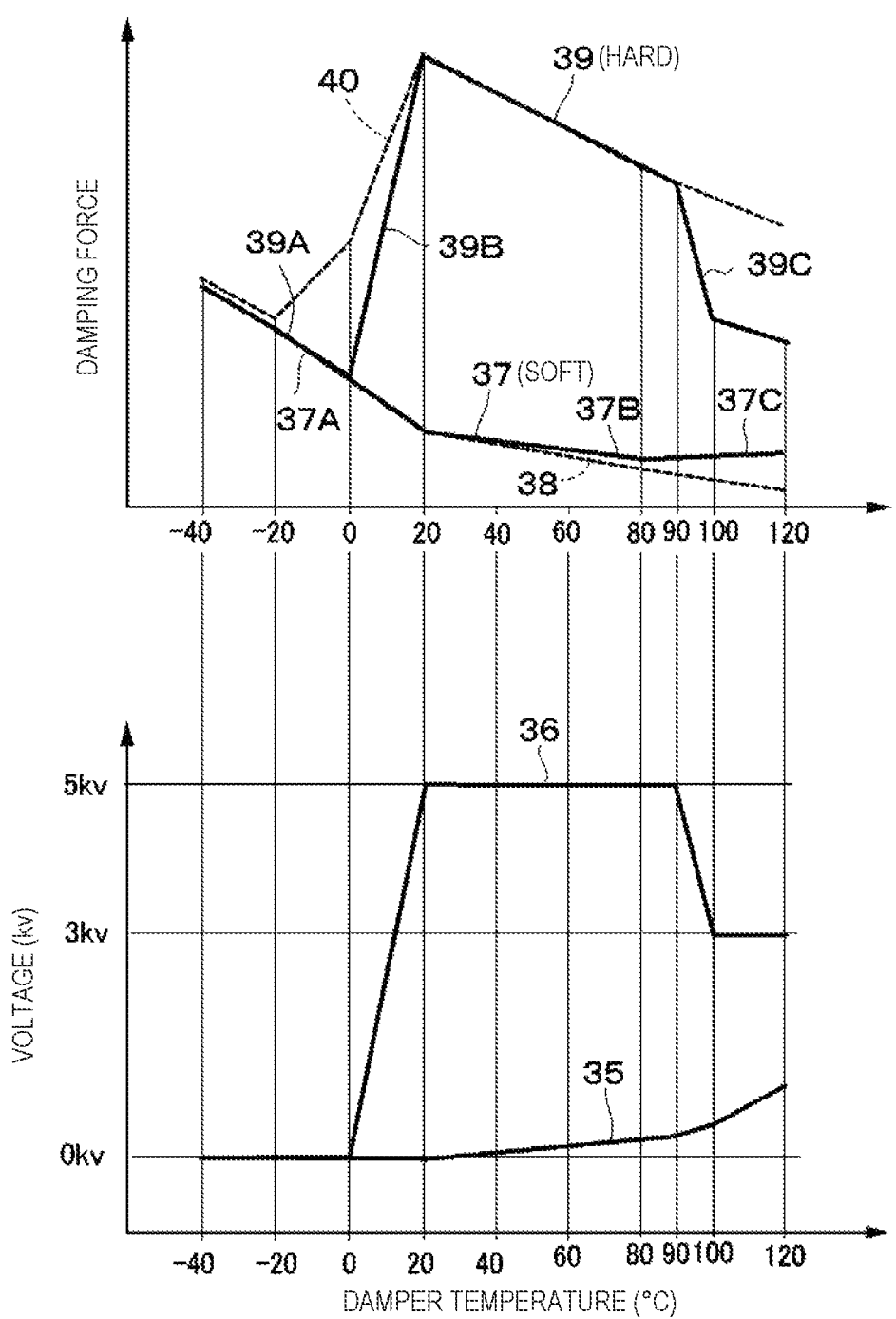
FIG. 7 is a characteristic line graph for showing a relationship between a damping force and a voltage command value with respect to the damper temperature.

However, when the temperature measurement control unit 30 makes a determination of "YES" in Step 4 and Step 5, the temperature estimation unit 28 cannot estimate and calculate the temperature of the ERF 10 for an almost similar reason to that at the start time. For example, when the damper temperature shown in FIG. 6 and FIG. 7 is low temperature equal to or lower than 0° C. to 20° C., the application voltage output from the high voltage driver 17 to the electrorheological damper 6 is set to zero (0 kv) as indicated by the characteristic lines 35 and 36. In this case, the voltage command value output from the controller 21 to the high voltage driver 17 is smaller than the set value, and the determination of "YES" is made in Step 4 and Step 5. In this case, the state in which the maximum command value is smaller than the set value has continued for the certain period of time.

Thus, in Step 2, the constant command (pseudo signal of the high voltage command) is output for the certain period of time by the processing of Step 2. As a result, the pseudo high voltage command is output from the temperature measurement control unit 30 to the high voltage driver 17 through intermediation of the maximum value selection unit 31. Consequently, even when the engine is being started, or when the output voltage is low, and the current value is thus extremely small and the temperature cannot be estimated, the high voltage driver 17 generates a voltage and a current is detected. As a result, the temperature can be estimated.

The maximum value selection unit 31 selects a larger voltage command value of the voltage command value (command value having the output limit) output from the damping force command calculation unit 27 through intermediation of the output limiting unit 29 and the voltage command value output from the temperature measurement control unit 30, and outputs the selected voltage command value to the high voltage driver 17 through intermediation of the responsiveness compensation unit 32. That is, as in the flowchart illustrated in FIG. 5, for example, when the engine is being started, or the high voltage command has been equal to or smaller than the set value for the certain period of time, the command output (pseudo command) output from the temperature measurement control unit 30 in Step 2 is larger than the voltage command value output from the damping force command calculation unit 27 through intermediation of the output limiting unit 29.

Under this state, the maximum value selection unit 31 selects the pseudo command output from the temperature measurement control unit 30, and outputs the constant pseudo command to the high voltage driver 17 as the voltage command value. However, under a state other than this state, the voltage command value output from the damping force command calculation unit 27 (output limiting unit 29) is selected by the maximum value selection unit 31, and this voltage command value is output to the high voltage driver 17 through intermediation of the responsiveness compensation unit 32.

The responsiveness compensation unit 32 is configured to correct the voltage command value selectively output from the maximum value selection unit 31 based on the corrected estimated temperature output from the temperature estimation unit 28. That is, under the state in which the temperature is high, the viscosity of the ERF 10 in the electrorheological damper 6 changes fast when the voltage command value changes, and the switching responsiveness is thus high. Meanwhile, under the state in which the temperature is low, the viscosity of the ERF 10 changes slowly when the voltage command value changes, and the switching responsiveness is thus low.

Thus, the responsiveness compensation unit 32 makes a correction, through responsiveness compensation in accordance with the temperature at the time, to the voltage command value output from the maximum value selection unit 31, to thereby output the corrected high voltage command value to the high voltage driver 17. More specifically, the responsiveness compensation unit 32 increases a limit on the switching speed (for example, a limit on a speed of the change in the voltage command value) when the temperature of the ERF 10 is high. The responsiveness compensation unit 32 reduces the limit on the switching speed (for example, the limit on a speed of the change in the high voltage command value) when the temperature is low.

The high voltage driver 17 outputs the high voltage corresponding to the corrected high voltage command value output from the responsiveness compensation unit 32 to the electrode tube 15 of the electrorheological damper 6. As a result, the viscosity of the ERF 10 in the electrorheological damper 6 is changed by the electric field generated by the applied high voltage. Consequently, the damping force generated in the electrorheological damper 6 becomes variably adjustable in accordance with the viscosity of the ERF 10. As another responsiveness compensation method, the switching responsiveness of the damping force in accordance with the temperature of the ERF 10 may be stored in advance, and the high voltage command may be corrected in accordance with the stored responsiveness so as to reflect a characteristic opposite to this responsiveness to the high voltage command.

In this way, the responsiveness compensation unit 32 applies the limit to the change in voltage command in accordance with the temperature, to thereby calculate the final voltage command value (corrected high voltage command value). Then, the controller 21 outputs the final voltage command value (corrected high voltage command value) from the responsiveness compensation unit 32 to the high voltage driver 17, to thereby switch the damping force of the electrorheological damper 6. As a result, the damping force generated in the electrorheological damper 6 can be brought to be close to a reference damping force generated at a reference temperature of the ERF 10 regardless of the temperature of the ERF 10 (irrespective of whether the temperature is high or low).

In this embodiment, the target damping force is used as the control command, but a target damping coefficient may be used instead. Moreover, the responsiveness compensation unit 32 may be omitted. In this case, the voltage command value output from the maximum value selection unit 31 may be output to the high voltage driver 17.

Characteristic lines 37 and 39 represented by the solid lines of FIG. 7 indicate a relationship between the temperature (damper temperature) of the ERF 10 and the damping force generated in the electrorheological damper 6. The characteristic line 37 indicates a case in which the damping force is adjusted to a soft characteristic, and, in this case, the high voltage command value corresponding to the voltage along the characteristic line 35 is output from the controller 21 to the high voltage driver 17. The characteristic line 39 indicates a case in which the damping force is adjusted to a hard characteristic, and, in this case, the high voltage command value corresponding to the voltage along the characteristic line 36 is output from the controller 21 to the high voltage driver 17.

Characteristic lines 38 and 40 represented by the dotted lines of FIG. 7 indicate the relationship between the temperature (damper temperature) of the ERF 10 and the damping force generated in the electrorheological damper 6 in a case in which, for example, the voltage command value is not limited by the output limiting unit 29 (hereinafter referred to as "comparative example"). The characteristic line 38 corresponds to the case in which the damping force is adjusted to the soft characteristic in the comparative example. The characteristic line 40 corresponds to the case in which the damping force is adjusted to the hard characteristic in the comparative example.

In characteristic line portions 37A and 39A corresponding to the damper temperature equal to or less than 0° C. of the characteristic lines 37 and 39 indicated by the solid lines of FIG. 7, the degree of viscosity (viscosity) of the ERF 10 increases as the temperature decreases. Accordingly, the applied voltage output from the high voltage driver 17 to the electrorheological damper 6 (electrode tube 15) in accordance with the voltage command value output from the controller 21 is reduced to the lowest value (0 kv) as indicated by the characteristic lines 35 and 36, and the damping forces represented by the characteristic line portions 37A and 39A have similar characteristics.

The damping force represented by the characteristic line 40 corresponding to the hard characteristic in the comparative example is larger than the damping force represented by the characteristic line 39 (in this embodiment) in a range of the damper temperature from −20° C. to +20° C. However, even when it is tried to adjust the damping force so that the damping force is large at low temperature in the electrorheological damper 6, the displacement speed (piston speed) of the piston 13 becomes excessively low. Accordingly, the heat generation is suppressed, and the increase in temperature of the ERF 10 takes an extra time. In this embodiment, to deal with this problem, as represented by the characteristic line portions 39A and 39B, the damping force set to the hard characteristic is suppressed so as to be smaller compared with the characteristic line 40 in the comparative example, to thereby allow the piston speed (relative speed) to be as high as possible so that the temperature of the ERF 10 increases early.

Moreover, the damping force represented by the characteristic line 40 corresponding to the hard characteristic in the comparative example is larger than the characteristic line portion 39C of the characteristic line 39 in a range of the damper temperature equal to or higher than 90° C. When the damper temperature becomes high temperature (for example, 90° C. or higher), the electrorheological damper 6 and the high voltage driver 17 are exposed to the high temperature, and there is particularly a fear for overheat of the high voltage driver 17. To deal with this problem, in this embodiment, the damping force set to the hard characteristic at high temperature is suppressed as indicated by the characteristic line portion 39C so as to be smaller compared with the characteristic line 40 in the comparative example, to thereby suppress the increase in temperature of the ERF 10.

Moreover, in this embodiment, the damping force set to the soft characteristic is set so as to be larger than the characteristic line 38 in the comparative example in a range in which the damper temperature is high, for example, 40° C. or higher as indicated by the characteristic line portions 37B and 37C of the characteristic line 37. In this case, the damping force set to the soft characteristic at the high temperature is set to be larger compared with the characteristic line 40 in the comparative example in order to suppress a further increase in the damper temperature. As a result, the damping force is increased so that the piston speed can be reduced to be as low as possible, to thereby suppress an excessive increase in temperature of the ERF 10.

The suspension control apparatus according to the first embodiment has the above-mentioned configurations. Description is now given of processing of using the controller 21 to variably control the damping force characteristic of the electrorheological damper 6.

The controller 21 receives the input of the detection signal corresponding to the sprung acceleration from the sprung acceleration sensor 7 during the travel of the vehicle, and simultaneously receives the input of the detection signal corresponding to the unsprung acceleration from the unsprung acceleration sensor 8. The integrator 22 of the controller 21 integrates the sprung acceleration, to thereby calculate the sprung speed. Then, the target damping force calculation unit 25 multiplies the sprung speed by, for example, the skyhook damping coefficient, to thereby calculate the target damping force to be generated in the electrorheological damper 6.

Meanwhile, the subtractor 24 of the controller 21 subtracts the unsprung acceleration from the sprung acceleration, to thereby calculate the relative acceleration, and the integrator 23 integrates the relative acceleration in order to calculate the relative speed, to thereby calculate the relative speed between the vehicle body 1 and the wheel 2. Moreover, as illustrated in FIG. 3, the temperature estimation unit 28 of the controller 21 estimates and calculates the corrected estimated temperature of the ERF 10 (damper temperature) based on a sensor value (external air temperature information) of the external air temperature sensor 9, and the high voltage monitor (voltage) and the high-voltage current monitor (current) of the high voltage driver 17.

In this configuration, the damping force limiting unit 26 of the controller 21 limits the maximum value of the target damping force based on the damper temperature estimated and calculated by the temperature estimation unit 28 and the relative speed between the vehicle body 1 and the wheel 2 in the vertical direction. The damping force limiting unit 26 limits the positive value and the negative value of the maximum value of the target damping force independently of each other. After that, the damping force command calculation unit 27 on the subsequent stage uses the command map to calculate the high voltage command value corresponding to the voltage (high voltage) to be output from the high voltage driver 17 from the target damping force, the relative speed, and the temperature of the ERF 10 at the time. Further, the output limiting unit 29 applies the limit to the high voltage command value output from the damping force command calculation unit 27 based on the damper temperature output from the temperature estimation unit 28, to thereby calculate the voltage command value having the output limit.

That is, the output limiting unit 29 applies the limit in accordance with the output limit map given by, for example, the characteristic lines 35 and 36 of FIG. 6 to the input command based on the damper temperature output from the temperature estimation unit 28, to thereby calculate the voltage command value having the output limit. The high voltage output from the high voltage driver 17 to the electrorheological damper 6 (electrode tube 15) in accordance with the voltage command value is limited to a range enclosed by the characteristic lines 35 and 36 of FIG. 6. The characteristic line 35 indicates a characteristic of a lowest voltage command limit value set in accordance with the damper temperature estimated by the temperature estimation unit 28. The characteristic line 36 indicates a characteristic of a highest voltage command limit value set in accordance with the damper temperature.

Consequently, when the damper temperature is lower than a predetermined temperature (for example, 0° C.), the high voltage output from the high voltage driver 17 to the electrorheological damper 6 (electrode tube 15) can be controlled along the lowest voltage command limit value (characteristic line 35) in accordance with the voltage command value output from the maximum value selection unit 31. As a result, the damping force characteristic of the electrorheological damper 6 can be suppressed to a small damping force set to any of the soft characteristic and the hard characteristic as indicated by the characteristic line portions 37A and 39A of FIG. 7, respectively.

A heat generation amount Q of the electrorheological damper 6 is given by Expression (1), where C1 represents a damping coefficient of the ERF 10, and V represents the piston speed.

$$Q = C1 \times V^2 \qquad (1)$$

As a result, the heat generation amount Q of the electrorheological damper 6 increases in proportion to the square of the piston speed V. The heat generation of the ERF 10 can be increased by allowing the increase in piston speed V (that is, the displacement speed of the piston 13 illustrated in FIG. 2), that is, setting the damping force to the soft characteristic. In other words, the displacement speed (piston speed V) of the piston 13 can be increased so as to be high by limiting, for example, to 0 V (zero volts), the voltage (high voltage) output from the high voltage driver 17 to the electrode tube 15 in accordance with the high voltage command output from the controller 21 at the extremely low temperature (for example, a temperature lower than 0° C.) at which the damping force is not switched, to thereby allow quick heat generation of the electrorheological damper 6 at the extremely low temperature. As a result, the temperature (damper temperature) of the ERF 10 can be controlled so as to reach a preferred temperature as soon as possible at the extremely low temperature, and power consumption can also be suppressed.

Meanwhile, when the damper temperature is high temperature (for example, a temperature of 40° C. to 90° C. or higher), it is required to suppress the increase in damper temperature as much as possible, to thereby prevent the overheat of the high voltage driver 17 and to suppress the generation of the overheat thereof.

Consequently, for example, the output limiting unit 29 of the controller 21 sets the highest voltage command limit value output from the high voltage driver 17 to the electrode tube 15 in accordance with the high voltage command output from the controller 21 to a small value as indicated by the characteristic line 36 (for example, a portion corresponding to 90° C. to 120° C.) when the damper temperature is high temperature (for example, equal to or higher than 90° C.). That is, the damping force set to the hard characteristic is suppressed as indicated by the characteristic line portion 39C of the characteristic line 39 so as to be smaller compared with the characteristic line 40 in the comparative example in the range of the damper temperature equal to or higher than 90° C., to thereby suppress the temperature increase of the ERF 10. In this case, the current value exponentially increases with respect to the voltage, and thus the heat generation can be reduced by half by limiting the highest voltage command limit value by approximately 20%.

Moreover, the lowest voltage command limit value output from the high voltage driver 17 to the electrode tube 15 in accordance with the high voltage command output from the controller 21 is set as indicated by the characteristic line 35 in the range in which the damper temperature is 40° C. or higher and is thus high. As a result, the damping force set to the soft characteristic can be set so as to be larger as indicated by the characteristic line portions 37B and 37C of the characteristic line 37 compared with the characteristic line 38 in the comparative example. Also in this case, the damping force set to the soft characteristic at the high temperature can be increased so as to be larger compared with the characteristic line 40 in the comparative example, to thereby allow the piston speed to decrease to be as low as possible so that the excessive increase in temperature of the ERF 10 can be suppressed.

Incidentally, when the applied voltage output from the high voltage driver 17 to the electrode tube 15 in accordance with the high voltage command output from the controller 21 is zero (that is, the voltage is not generated, and the current is thus zero), an electric characteristic (for example, the electrical resistance value) of the ERF 10 cannot be calculated, and the temperature estimation unit 28 cannot thus estimate and calculate the damper temperature.

To deal with this problem, the temperature measurement control unit 30 of the controller 21 outputs the constant voltage command for the certain period of time as in Step 2 illustrated in FIG. 5 in order to estimate the temperature both when the engine is being started (immediately after the startup) and when the voltage value indicated by the characteristic lines 35 are 36 are set to zero at low temperature (for example, when the damper temperature is equal to or lower than 20° C. as shown in FIG. 6 and FIG. 7). That is, the pseudo high voltage command is output from the temperature measurement control unit 30 to the high voltage driver 17 through intermediation of the maximum value selection unit 31. As a result, even when the engine is being started or even when the output voltage is low, the current value is thus zero, and the temperature cannot consequently be estimated, the high voltage driver 17 receives the pseudo high voltage command, and the temperature estimation unit 28 consequently comes to be able to detect the current. As a result, the temperature estimation unit 28 can estimate the temperature.

As described above, the constant voltage command (pseudo high voltage command) is output in order to estimate the temperature both when the engine is being started and when the required current value cannot be detected (when the voltage command is small). As a result, the temperature can be estimated, and temperature compensation control can appropriately be executed both immediately after the system starts up and from a time point at which the damper temperature becomes preferred.

Thus, according to the first embodiment, the controller 21 includes the target voltage value setting unit (for example, the damping force command calculation unit 27), the temperature estimation unit (temperature estimation unit 28), and the target voltage value correction unit (for example, the output limiting unit 29). The target voltage value setting unit is configured to obtain the target voltage value to be applied to the electrode (electrode tube 15) based on the detection result obtained by the vehicle behavior detection unit. The temperature estimation unit is configured to detect or estimate the temperature of the functional fluid (ERF 10). The target voltage value correction unit is configured to change the target voltage value in order to adjust the piston speed V based on the value obtained by the temperature estimation unit.

As a result, the target voltage value correction unit fixes the target voltage value (voltage command value) to the soft characteristic at the extremely low temperature (for example, when the damper temperature is lower than 0° C.), to thereby bring about the state in which the piston speed V is likely to become higher. As a result, the heat generation of the ERF 10 can be facilitated, to thereby increase the temperature of the ERF 10 to temperature preferred for the electrorheological damper 6.

That is, when the temperature of the functional fluid (ERF 10) is the extremely low temperature lower than a predetermined value, the target voltage value is decreased so as to be smaller than the predetermined value in order to increase the piston speed V. The heat generation amount Q of the electrorheological damper 6 increases in proportion to the square of the piston speed V. Accordingly, the heat generation of the ERF 10 can be increased by setting the damping force to the soft characteristic so as to allow the piston speed V to increase to high speed, and the temperature of the ERF 10 can consequently be increased to the temperature preferred for the electrorheological damper 6.

Moreover, when the temperature of the ERF 10 is temperature higher than the predetermined value, the target voltage value is increased so as to be larger than the predetermined value in order to increase the damping force to be generated, to thereby suppress the piston speed V. That is, when the damping force is set to the soft characteristic, the decrease in damping force caused by the decrease in viscosity of the ERF 10 can be suppressed by setting the lowest voltage command limit value (characteristic line 35 of FIG. 6) to be a value larger than zero (0 kv) in accordance with the temperature when the damper temperature is high temperature. Further, an increase in piston speed to an excessively high speed can be suppressed, and a further increase in damper temperature can be suppressed.

Meanwhile, in a case in which the damping force is set to the hard characteristic, when the damper temperature is high, the maximum voltage command value (characteristic line 36 of FIG. 6) is limited in accordance with the temperature, thereby being capable of suppress the overheat of the high voltage driver 17 and the like. In this case, the current value exponentially increases with respect to the voltage, and thus the heat generation of the ERF 10 can be suppressed by limiting the highest voltage command limit value. For example, as shown in FIG. 7, the damping force set to the hard characteristic is suppressed as indicated by the characteristic line portion 39C of the characteristic line 39 so as to be smaller compared with the characteristic line 40 in the comparative example in the range of the damper temperature equal to or higher than 90° C., thereby being capable of suppressing the temperature increase of the ERF 10.

Figure 8:
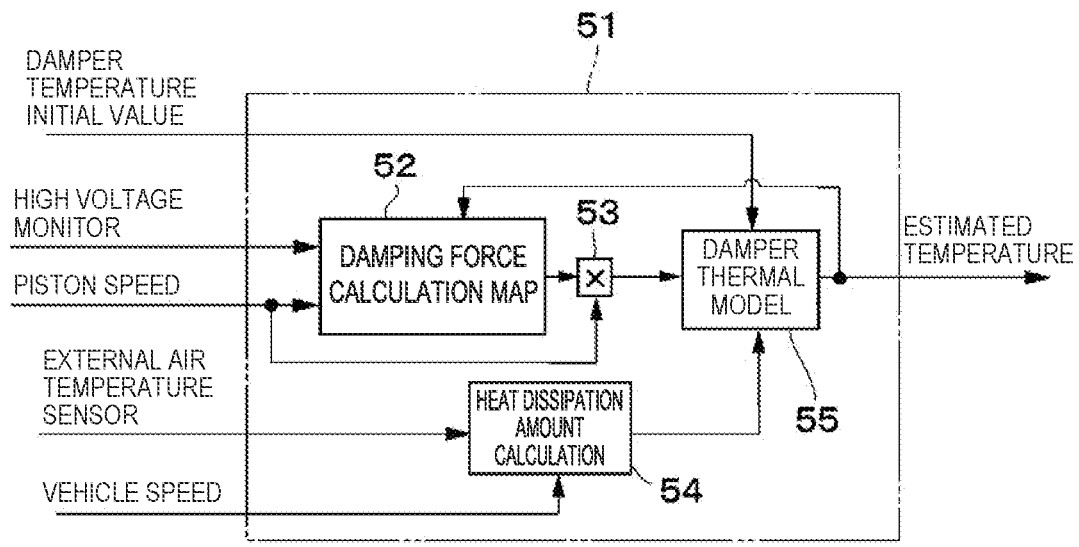
FIG. 8 is a control block diagram for illustrating a temperature estimation unit in a second embodiment of the present invention.
Figure 9:
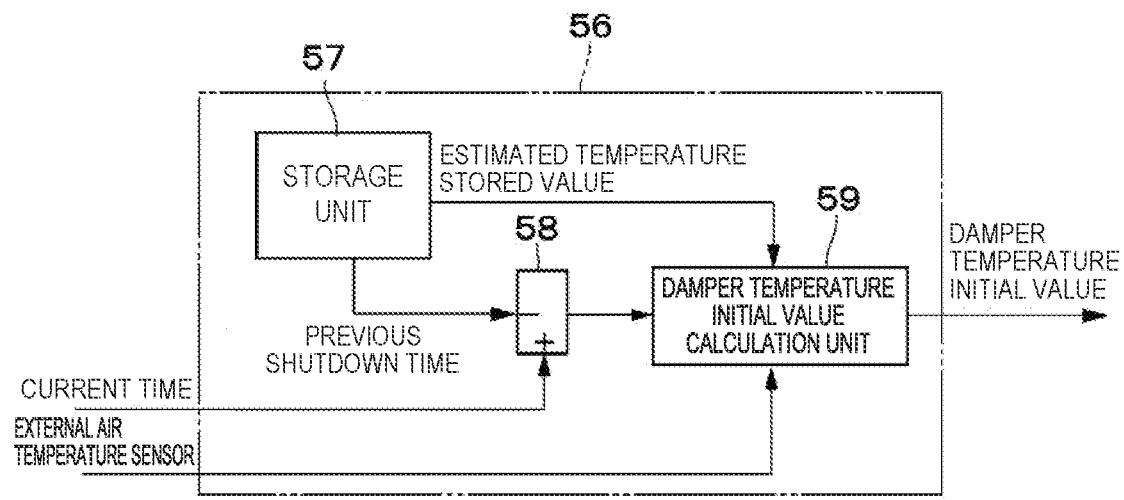
FIG. 9 is a control block diagram for illustrating an initial value calculation unit configured to calculate a damper temperature initial value of FIG. 8.

Next, FIG. 8 and FIG. 9 are each an illustration of a second embodiment of the present invention. In this embodiment, the same components as those in the first embodiment are denoted by the same reference numerals, and description thereof is omitted. Meanwhile, a feature of the second embodiment is a configuration in which a thermal model of the electrorheological damper 6 is used to estimate and calculate the damper temperature.

A temperature estimation unit 51 employed in the second embodiment is different from the temperature estimation unit 28 described in the first embodiment, and includes a damping force calculation map unit 52, a multiplication unit 53, a heat dissipation amount calculation unit 54, and a damper thermal model unit 55 as illustrated in FIG. 8. The damping force calculation map unit 52 of the temperature estimation unit 51 uses the monitor value of the high voltage applied from the high voltage driver 17 to the electrorheological damper 6 (electrode tube 15) and the piston speed V to calculate the damping force F generated in the electrorheological damper 6. Output (estimated temperature) of the damper thermal model unit 55 is returned to the damping force calculation map unit 52 as a feedback signal. As a result, the damping force F calculated by the damping force calculation map unit 52 becomes a damping force reflecting the temperature (damper temperature) of the ERF 10.

The multiplication unit 53 on the subsequent stage multiplies the damping force F and the piston speed V by each other to calculate the heat generation amount Q as given by Expression (2).

$$Q = F \times V \qquad (2)$$

Meanwhile, the heat dissipation amount calculation unit 54 uses the external air temperature detected by the external air temperature sensor 9 and the travel speed (vehicle speed) of the vehicle to calculate a heat dissipation amount. That is, when the vehicle is traveling, a cooling wind in accordance with the vehicle speed communicates around the outer tube 12 of the electrorheological damper 6. The ERF 10 of the electrorheological damper 6 is thus cooled (the heat thereof is dissipated) by the cooling wind. The heat dissipation amount at the time is increased and decreased in accordance with the external air temperature. The heat dissipation amount calculation unit 54 can calculate the heat dissipation amount through use of a heat dissipation amount calculation map (not shown) obtained in advance from a relationship between the external air temperature and the vehicle speed.

As illustrated in FIG. 8, the damper thermal model unit 55 of the temperature estimation unit 51 uses the output (that is, the heat generation amount Q of the damper) of the multiplication unit 53, the heat dissipation amount calculated by the heat dissipation amount calculation unit 54, and a damper temperature initial value described below to calculate the estimated temperature (damper temperature). The estimated temperature (damper temperature) is obtained as temperature reflecting the damper temperature initial value.

FIG. 9 is an illustration of an initial value calculation unit 56 configured to calculate the damper temperature initial value. The initial value calculation unit 56 is provided, for example, along with the temperature estimation unit 51 that replaces the temperature estimation unit 28, in the controller 21 described in the first embodiment.

Moreover, a storage unit 57, a time measurement unit 58, and a damper temperature initial value calculation unit 59 are provided in the initial value calculation unit 56. The storage unit 57 is formed of, for example, a ROM, a RAM, or a nonvolatile memory. A power supply OFF time after an end of previous travel of the vehicle (that is, a shutdown time) and an estimated damper temperature stored value at the time are stored in the storage unit 57 in an updatable manner.

The time measurement unit 58 receives a current time through a time signal from a timer built into the controller 21 or from the CAN when the engine is started and the power supply is thus turned ON. Moreover, the time measurement unit 58 receives the previous shutdown time from the storage unit 57. As a result, the time measurement unit 58 calculates and measures an elapsed period of time from the previous shutdown time to the current time.

In the electrorheological damper 6, the ERF 10 generates heat by a shock absorbing action (that is, repetition of the slide and the displacement of the piston 13) caused by input from a road surface during the travel of the vehicle, and the temperature thereof thus increases. When the vehicle stops after the travel, the piston 13 stops in the electrorheological damper 6, and the piston speed becomes zero. As a result, the heat generation of the ERF 10 consequently becomes zero. In this state, the electrorheological damper 6 dissipates the heat in accordance with a difference between the external air temperature and the damper temperature, and the damper temperature becomes the same as the external air temperature when a sufficiently long period of time has elapsed. That is, when the vehicle stopped after the travel, and a sufficiently long period of time has elapsed, the estimated temperature (damper temperature) of the ERF 10 becomes equal to the external air temperature. Accordingly, the temperature estimation can be started while assuming that the estimated temperature initial value is equal to the external air temperature.

However, there may be a case in which, when the power supply to the controller 21 was turned off after the vehicle was stopped, the power supply to the controller 21 is turned on and the travel of the vehicle is resumed (started) under a state in which a sufficiently long period of time has not elapsed (that is, under a state before the damper temperature becomes the external air temperature). In this case, when the damper temperature initial value is set to the external air temperature, a difference from the actual damper temperature occurs, and an estimation error of the damper temperature is thus large.

Thus, the estimated damper temperature (estimated temperature stored value) and the shutdown time are stored in the storage unit 57 when the power supply is turned off after the end of the previous travel. When the power supply is later turned on, the damper temperature initial value calculation unit 59 reads out the estimated temperature stored value and the previous shutdown time from the storage unit 57, and calculates the damper temperature initial value based on the read value and time, the current time, and the external air temperature sensor value.

That is, the time measurement unit 58 illustrated in FIG. 9 calculates a difference between the previous shutdown time read out from the storage unit 57 and the current time, to thereby calculate the elapsed period of time since the previous shutdown. The damper temperature initial value calculation unit 59 uses, for example, a damper temperature initial value calculation map to determine the damper temperature initial value from the calculated elapsed time, the estimated temperature stored value, and the external air temperature sensor value. As a result, the damper temperature initial value is estimated as a value close to the estimated damper temperature stored value when the elapsed period of time is short. Meanwhile, the damper temperature initial value is estimated as a value close to the external air temperature when the elapsed period of time is long.

Thus, the second embodiment is configured to use the thermal model of the electrorheological damper 6 to estimate and calculate the damper temperature. As a result, the damper temperature can be estimated based on the heat generation amount Q given by Expression (2), the heat dissipation amount during the travel, and the damper temperature initial value, thereby being capable of increasing an estimation precision thereof. Moreover, according to the second embodiment, the temperature measurement control unit 30 and the maximum value selection unit 31 of the controller 21 illustrated in FIG. 1 can be omitted, and the voltage command value having the output limit calculated by the output limiting unit 29 can directly be output from the controller 21 to the high voltage driver 17.

Figure 10:
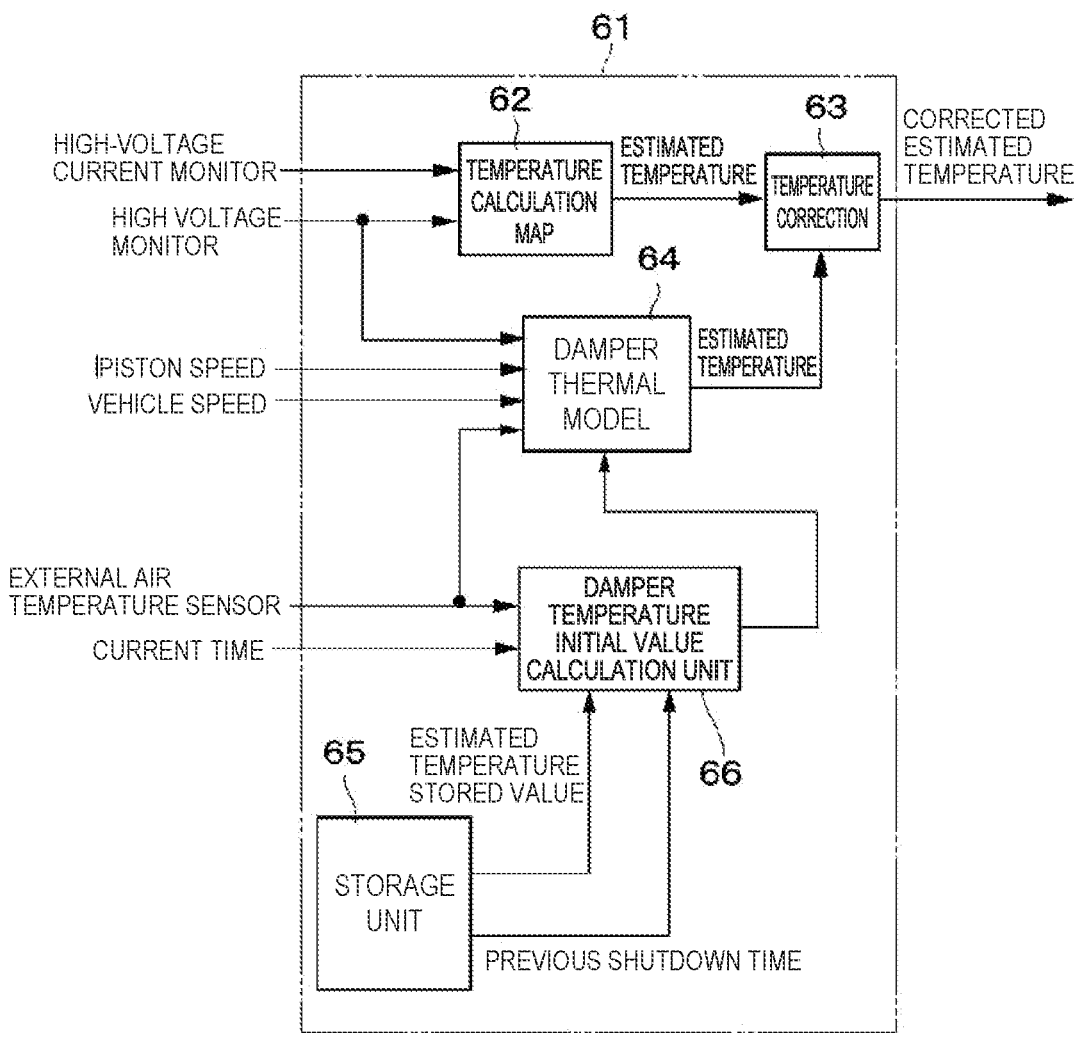
FIG. 10 is a control block diagram for illustrating a temperature estimation unit in a third embodiment of the present invention.

Next, FIG. 10 is an illustration of a third embodiment of the present invention. In this embodiment, the same components as those in the first embodiment are denoted by the same reference numerals, and description thereof is omitted. Meanwhile, a feature of the third embodiment is a configuration in which a thermal model of the electrorheological damper 6 is used to estimate and calculate the damper temperature when the external air temperature is low and the current detection is thus difficult.

A temperature estimation unit 61 employed in the third embodiment includes a temperature calculation map unit 62 and a temperature correction unit 63 almost similar to the temperature calculation map unit 28A and the temperature correction unit 28B of the temperature estimation unit 28 described in the first embodiment. Meanwhile, when the applied voltage output from the high voltage driver 17 to the electrorheological damper 6 in accordance with the voltage command output from the controller 21 is zero (that is, the voltage is not generated, and the current is thus zero), the temperature estimation unit 28 in the first embodiment cannot calculate the electric characteristic (for example, the electrical resistance value) of the ERF 10, and cannot estimate and calculate the damper temperature unless the temperature measurement control unit 30 and the maximum value selection unit 31 are provided in the controller 21.

Thus, the temperature estimation unit 61 employed in the third embodiment includes a damper thermal model unit 64, a storage unit 65, and a damper temperature initial value calculation unit 66 in addition to the temperature calculation map unit 62 and the temperature correction unit 63. The damper thermal model unit 64 has a function almost similar to that of the damping force calculation map unit 52, the multiplication unit 53, the heat dissipation amount calculation unit 54, and the damper thermal model unit 55 described in the second embodiment.

The storage unit 65 is configured almost similarly to the storage unit 57 described in the second embodiment. The estimated damper temperature (estimated temperature stored value) at the time when the power supply was turned off previously and the previous shutdown time are stored in the updatable manner in the storage unit 65. The damper temperature initial value calculation unit 66 has a function similar to that of the time measurement unit 58 and the damper temperature initial value calculation unit 59 described in the second embodiment.

The temperature estimation unit 61 employed in the third embodiment uses an estimated temperature calculated by the damper thermal model unit 64 when the external air temperature is low and the current detection is thus difficult. The temperature correction unit 63 outputs the estimated temperature as the corrected estimated temperature. Meanwhile, when the external air temperature is high, and the current can thus be detected as the high-voltage current monitor, there is used the estimation value based on the electric characteristic in accordance with the temperature (damper temperature) of the ERF 10 as described in the first embodiment, that is, the estimated temperature output from the temperature calculation map unit 62, and the temperature correction unit 63 can output the estimated temperature as the corrected estimated temperature.

Thus, according to the third embodiment, the temperature estimation unit 61 can set the estimated temperature calculated by the damper thermal model unit 64 as the corrected estimated temperature until the estimated temperature based on the electric characteristic becomes a certain value or larger, and can calculate, in the temperature correction unit 63, the estimated temperature based on the electric characteristic output from the temperature calculation map unit 62 as the corrected estimated temperature when the estimated temperature based on the electric characteristic is equal to or higher than the certain value. Consequently, the temperature estimation unit 61 can smoothly switch the corrected estimated temperature in the temperature correction unit 63 from the estimated temperature that is based on the thermal model to the estimated temperature that is based on the electric characteristic, thereby being capable of increasing the estimation precision of the damper temperature in the temperature estimation unit 61.

Moreover, according to the third embodiment, the temperature measurement control unit 30 and the maximum value selection unit 31 of the controller 21 illustrated in FIG. 1 can be omitted, and the voltage command value having the output limit calculated by the output limiting unit 29 can directly be output from the controller 21 to the high voltage driver 17.

Figure 11:
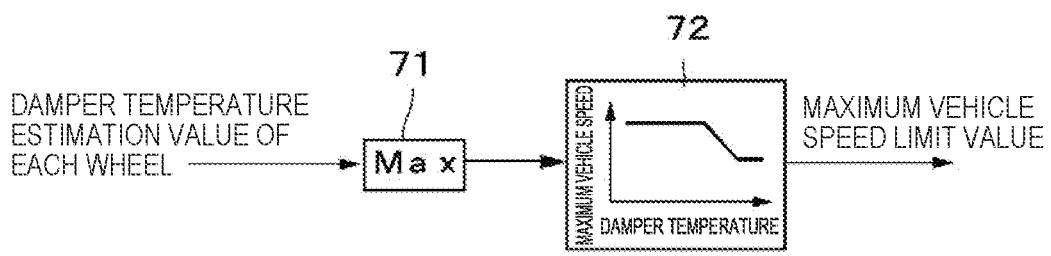
FIG. 11 is a control block diagram for illustrating maximum vehicle speed limiting processing in a fourth embodiment of the present invention.

Next, FIG. 11 is an illustration of a fourth embodiment of the present invention. In this embodiment, the same components as those in the first embodiment are denoted by the same reference numerals, and description thereof is omitted. Meanwhile, a feature of the fourth embodiment is a configuration in which a limit is applied to the travel speed of the vehicle at the time when the damper temperature increases to high temperature.

In FIG. 11, a maximum value selection unit 71 selects the damper temperature of the electrorheological damper 6 having the highest temperature (damper temperature) of the ERF 10 among the electrorheological dampers 6 each provided for each wheel 2. A maximum vehicle speed limiting unit 72 limits the maximum vehicle speed (travel speed) of the vehicle in accordance with the damper temperature output from the maximum value selection unit 71.

That is, in the electrorheological damper 6, as the travel speed of the vehicle increases, the temperature is increased by the heat generation of the ERF 10 due to the shock absorbing action (that is, the slide and the displacement of the piston 13) caused by the input from the road surface during the travel in addition to the heat generation from the engine. To deal with this problem, the maximum speed limiting unit 72 limits the maximum vehicle speed (travel speed) in accordance with a limit map illustrated in FIG. 11 in order to suppress the overheat of the electrorheological damper 6 and/or the high voltage driver 17. The maximum value selection unit 71 and the maximum vehicle speed limiting unit 72 are provided in a controller (for example, the controller 21 illustrated in FIG. 1 or a controller 81 illustrated in FIG. 12 described below) configured to provide such control as to adjust the damping force of the electrorheological damper 6.

Thus, according to the fourth embodiment, when the damper temperature of the electrorheological damper 6 increases to temperature equal to or higher than a predetermined threshold temperature, a maximum vehicle speed limit value applied to the vehicle is gradually reduced. Consequently, the heat generation of the ERF 10 can be suppressed, and the increase in temperature of the electrorheological damper 6 is suppressed, thereby being capable of preventing the overheat and the like from occurring. As described above, when the damper temperature increases to temperature equal to or higher than the threshold temperature, the damper heat generation amount can be reduced by gradually reducing the maximum vehicle speed limit value, and the damping force characteristic of the electrorheological damper 6 can be set so as to be appropriate, thereby being capable of maintaining stability of the vehicle.

Figure 12:
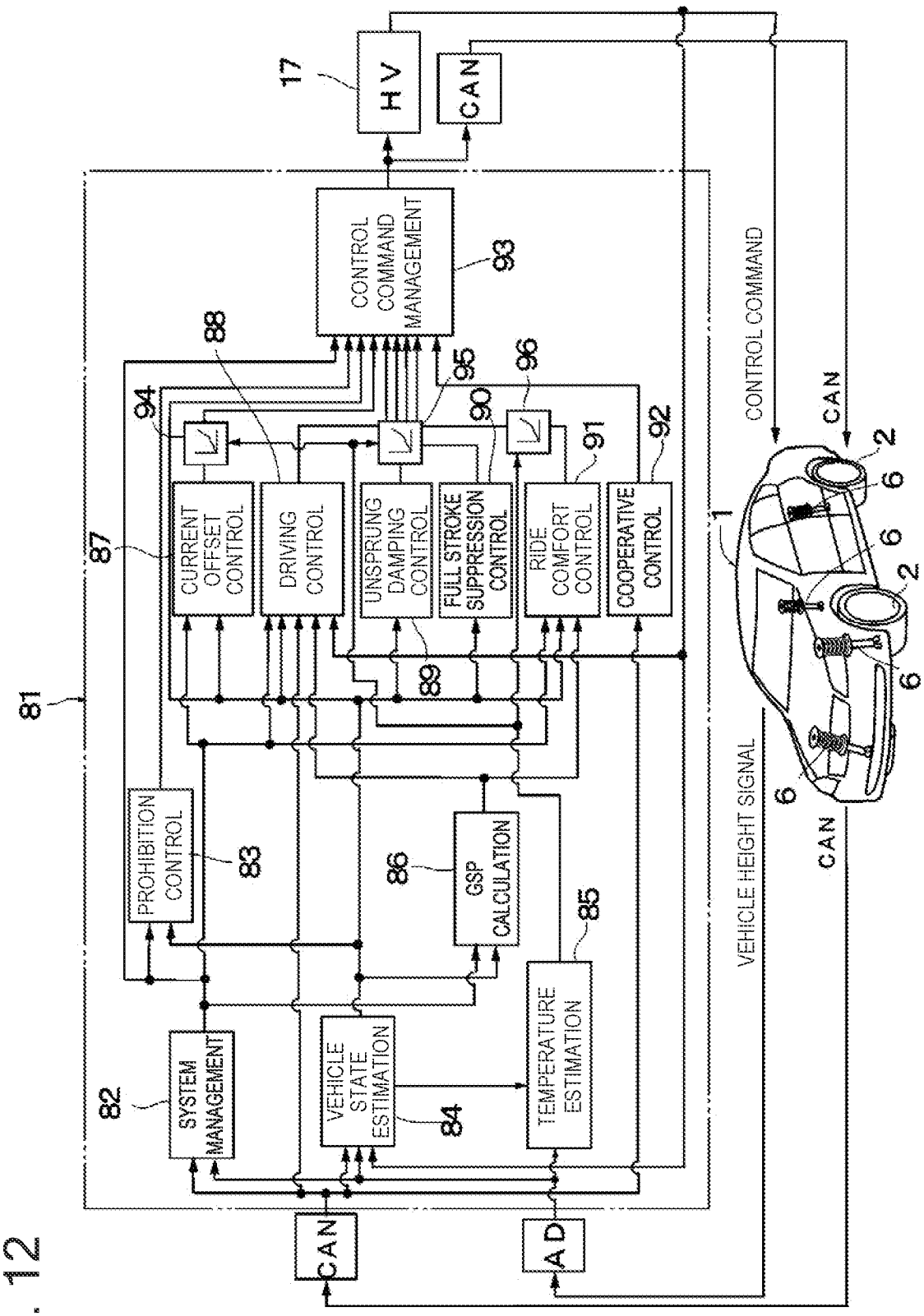
FIG. 12 is a control block diagram for illustrating an overall configuration of a suspension control apparatus according to a fifth embodiment of the present invention.

Next, FIG. 12 is an illustration of a fifth embodiment of the present invention. In this embodiment, the same components as those in the first embodiment are denoted by the same reference numerals, and description thereof is omitted. Meanwhile, a feature of the fifth embodiment is a configuration in which damping force control for the electrorheological damper 6 is executed by the controller 81 based on the CAN signal, a vehicle height signal, and the like of the vehicle.

The controller 81 employed in the fifth embodiment is configured almost similarly to the controller 21 described in the first embodiment, and includes a system management unit 82, a prohibition control unit 83, a vehicle state estimation unit 84, a temperature estimation unit 85, a GSP calculation unit 86, a power supply offset control unit 87, a driving control unit 88, an unsprung damping control unit 89, a full stroke suppression control unit 90, a ride comfort control unit 91, a cooperative control unit 92, and a control command management unit 93.

A first signal correction unit 94 is provided between the control command management unit 93 and the power supply offset control unit 87. The first signal correction unit 94 is configured to correct an output signal from the power supply offset control unit 87 through map calculation in accordance with the damper temperature. For example, a second signal correction unit 95 is provided between the unsprung damping control unit 89 and the control command management unit 93. The second signal correction unit 95 is configured to correct an output signal from the unsprung damping control unit 89 through map calculation in accordance with the damper temperature. Moreover, a third signal correction unit 96 is provided between the ride comfort control unit 91 and the control command management unit 93. The third signal correction unit 96 is configured to correct an output signal from the ride comfort control unit 91 through map calculation in accordance with the damper temperature.

The vehicle state estimation unit 84 obtains, through calculation, the sprung speed and the relative speed (the piston speed as the displacement speed of the piston 13) of the vehicle body 1 based on the signal (for example, the CAN signal, the vehicle height signal, and the like) from the vehicle behavior detection unit. The vehicle state estimation unit 84 uses vehicle height information output from the vehicle height sensor (not shown) to estimate and calculate the sprung speed and the relative speed as feedback road surface state values. The vehicle height information also represents a vertical displacement of the vehicle body 1. The sprung speed of the vehicle body 1 and the relative speed between the vehicle body 1 and the wheel 2 can be obtained by differentiating the vertical displacement.

The ride comfort control unit 91 of the controller 81 executes ride comfort control (skyhook, bilinear optimal control, or the like) based on information (that is, information input from the vehicle behavior detection unit) such as the sprung speed and the vehicle speed estimated by the vehicle state estimation unit 84, and forms the target voltage value setting unit configured to calculate the target damping force to be generated by the electrorheological damper 6, that is, the target voltage value to be applied to the electrode tube 15.

The temperature estimation unit 85 is configured almost similarly to, for example, the temperature estimation unit 28 described in the first embodiment, the temperature estimation unit 51 described in the second embodiment, or the temperature estimation unit 61 described in the third embodiment, and constitutes a temperature estimation unit configured to detect or estimate the temperature of the ERF 10 (functional fluid) as the damper temperature. The damper temperature obtained by the temperature estimation unit 85 is output to the first signal correction unit 94, the second signal correction unit 95, the third signal correction unit 96, and the like, and is used to correct the high voltage command to be output to the high voltage driver 17 in accordance with the damper temperature.

The control command management unit 93 obtains, through calculation, the high voltage command to be output to the high voltage driver 17 based on signals output from the system management unit 82, the prohibition control unit 83, the vehicle state estimation unit 84, the cooperative control unit 92, the first to third signal correction units 94, 95, and 96, and the like. The control command management unit 93 constitutes the target voltage value correction unit along with the first to third signal correction units 94, 95, and 96. That is, the target voltage value correction unit adjusts the piston speed based on the value of the damper temperature estimated by the temperature estimation unit 85, and is thus configured to change the target voltage value.

In other words, the first to third signal correction units 94, 95, and 96 and the control command management unit 93 apply, almost similarly to the output limiting unit 29 described in the first embodiment, the limit, in accordance with the output limit map given by, for example, the characteristic lines 35 and 36 of FIG. 6, to the input command based on the estimated temperature (that is, the damper temperature) output from the temperature estimation unit 85, to thereby calculate the voltage command value (high voltage command) having the output limit.

However, the control command management unit 93 suspends the calculation of the voltage command value having the output limit under the following conditions (1) to (4), and directly outputs the voltage command value without the output limit to the high voltage driver 17. As a result, the control command management unit 93 can suppress a decrease in stability and a decrease in performance during the travel of the vehicle. (1) "Maneuverability and stability control" is prioritized over the output limit in accordance with the damper temperature. This is because maintaining the maneuverability and the stability is more important than the output limit of the electrorheological damper 6, the piston speed is low, and generated energy is low. (2) "Full stroke suppression control" is prioritized over the output limit in accordance with the damper temperature. Occurrence of a full stroke (a full extension and a full contraction) of the electrorheological damper 6 has great influence on the damper performance, and control by the full stroke suppression control unit 90 is prioritized. (3) Damping control on a "tortuous road" is prioritized over the output limit in accordance with the damper temperature. This is because damping the vehicle body on the "tortuous road" is more important than the output limit of the electrorheological damper 6. (4) "Cooperative control" is prioritized over the output limit in accordance with the damper temperature. This is because maintaining the maneuverability and the stability is more important than the output limit of the electrorheological damper 6, has an extremely low operation frequency, and thus has small influence on the temperature.

Thus, also according to the fifth embodiment configured as described above, similarly to each of the embodiments described above, the control is provided so that the temperature of the ERF 10 is an appropriate temperature, thereby being capable of suppressing the decrease in performance of the electrorheological damper 6 (damping force adjustable shock absorber) and suppressing the overheat.

Moreover, according to this embodiment, for example, the unsprung damping control unit 89 and the control command management unit 93 illustrated in FIG. 12 variably adjust the generated damping force in accordance with a road surface amplitude to change the heat generation amount of the electrorheological damper 6, thereby being capable of providing the control of facilitating the temperature increase of the ERF 10 and suppressing the temperature of the ERF 10. The vehicle state estimation unit 84 can use, for example, the signals from the unsprung acceleration sensor 8 and the vehicle height sensor to detect and estimate a state of a travel road surface. Moreover, the vehicle state estimation unit 84 can use, for example, an imaging device such as a digital camera or a laser sensor to obtain road surface preview information, to thereby recognize the state of the travel road surface. The vehicle state estimation unit 84 outputs a signal that indicates the state of the travel road surface to the unsprung damping control unit 89.

The inventors of the present invention have confirmed how the heat generation amount of the damper changes in accordance with the damping force characteristic of the electrorheological damper 6 in test data of FIG. 13 to FIG. 16. The horizontal axis of the test data represents the vibration frequency. The vertical axis thereof represents the heat generation amount. The heat generation is always a positive value, and is thus calculated as [damping force x relative speed x sgn (relative speed)]. The heat generation is then evaluated as a PSD obtained through frequency analysis of a magnitude of the heat generation amount. The relative speed is equal to the displacement speed (that is, the piston speed) of the piston 13.

Figure 13:
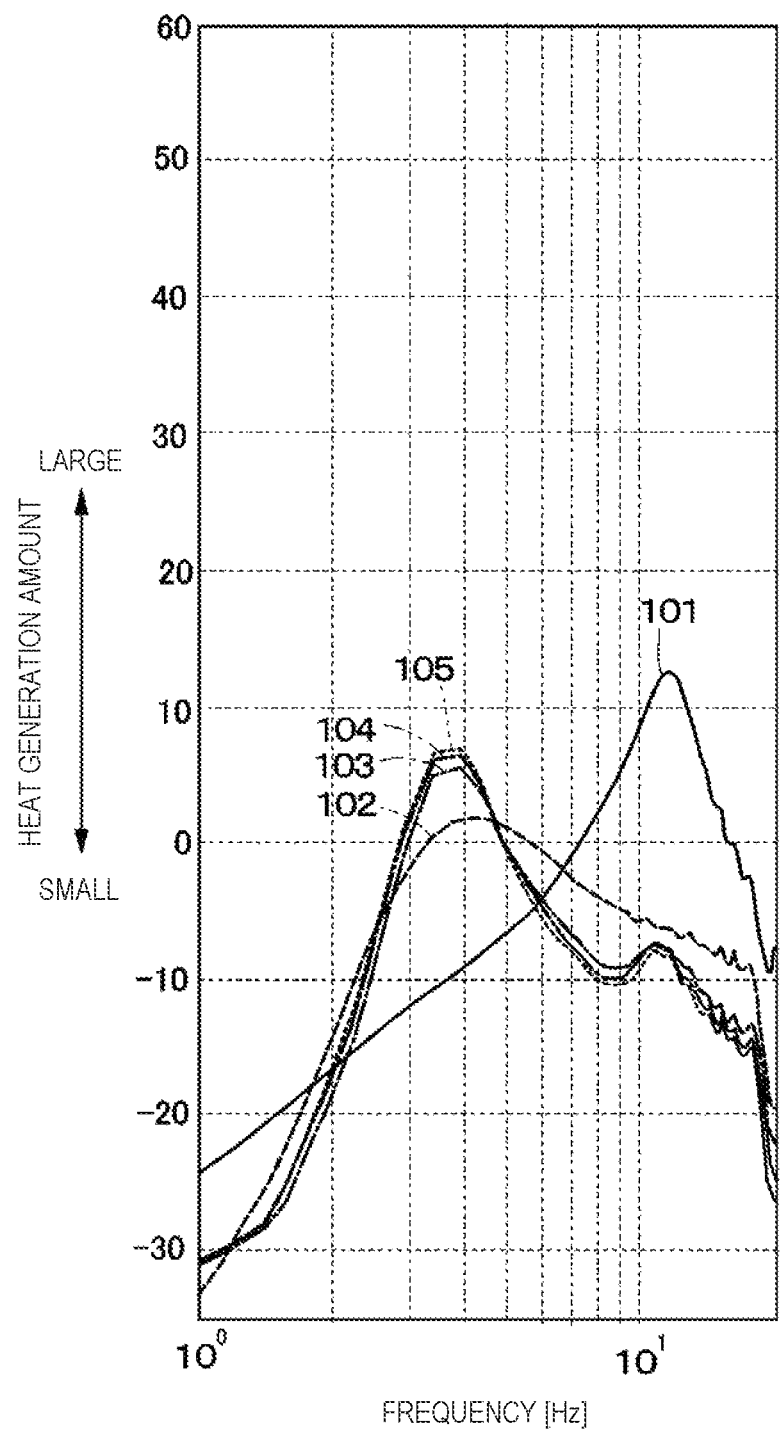
FIG. 13 is a characteristic line diagram for showing a relationship between a vibration frequency and a damper heat generation amount at the time when a control command value directed to the electrorheological damper is changed from the control command value for a soft characteristic to the control command value for a hard characteristic.

FIG. 13 shows a case in which, for example, the road surface amplitude is 0.001 m. A characteristic line 101 indicated by the solid line of FIG. 13 indicates a case in which a voltage value of a high voltage command output from the control command management unit 93 to the high voltage driver 17 is, for example, 0 kV, and the damping force of the electrorheological damper 6 is set to the soft characteristic. A characteristic line 102 indicated by the broken line of FIG. 13 indicates a case in which the voltage value is, for example, 1.25 kV, and the damping force of the electrorheological damper 6 is increased from that set to the soft characteristic.

A characteristic line 103 indicated by the one-dot chain line of FIG. 13 indicates a case in which the voltage value is, for example, 2.5 kV, and the damping force of the electrorheological damper 6 is set to a medium characteristic. A characteristic line 104 indicated by the two-dot chain line of FIG. 13 indicates a case in which the voltage value is, for example, 3.75 kV, and the damping force of the electrorheological damper 6 is slightly reduced from that set to the hard characteristic. A characteristic line 105 indicated by the dotted line of FIG. 13 indicates a case in which the voltage value is, for example, 5 kV, and the damping force of the electrorheological damper 6 is set to the hard characteristic.

Figure 14:
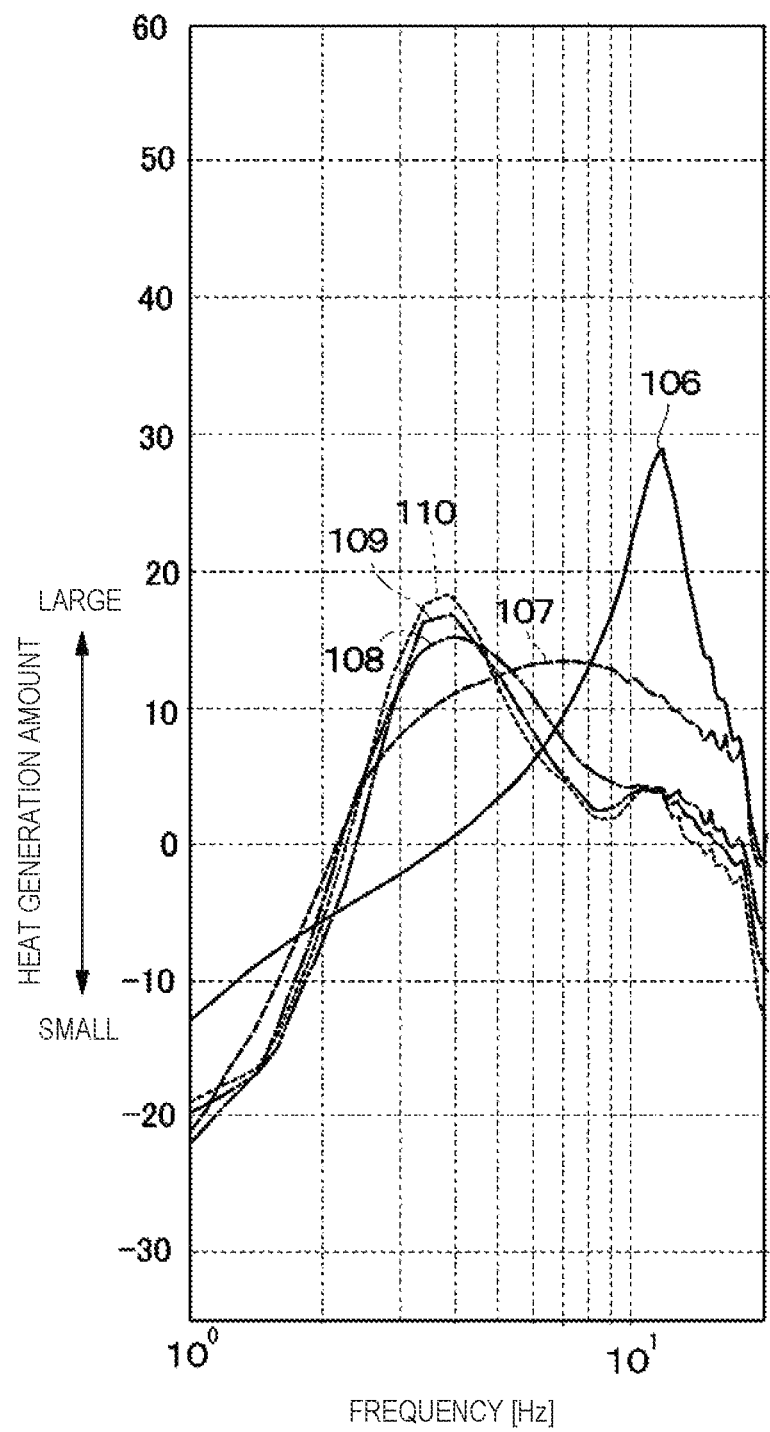
FIG. 14 is a characteristic line diagram for showing a relationship between the vibration frequency and the damper heat generation amount at the time when a road surface amplitude is increased from the road surface amplitude of FIG. 13.

FIG. 14 shows a case in which, for example, the road surface amplitude is 0.002 m. A characteristic line 106 indicated by the solid line indicates a case in which the voltage value is, for example, 0 kV, and the damping force of the electrorheological damper 6 is set to the soft characteristic. A characteristic line 107 indicated by the broken line of FIG. 14 indicates a case in which the voltage value is, for example, 1.25 kV, and the damping force of the electrorheological damper 6 is increased from that set to the soft characteristic. A characteristic line 108 indicated by the one-dot chain line of FIG. 14 indicates a case in which the voltage value is, for example, 2.5 kV, and the damping force of the electrorheological damper 6 is set to the medium characteristic. A characteristic line 109 indicated by the two-dot chain line of FIG. 14 indicates a case in which the voltage value is, for example, 3.75 kV, and the damping force of the electrorheological damper 6 is reduced from that set to the hard characteristic. A characteristic line 110 indicated by the dotted line of FIG. 14 indicates a case in which the voltage value is, for example, 5 kV, and the damping force of the electrorheological damper 6 is set to the hard characteristic.

Figure 15:
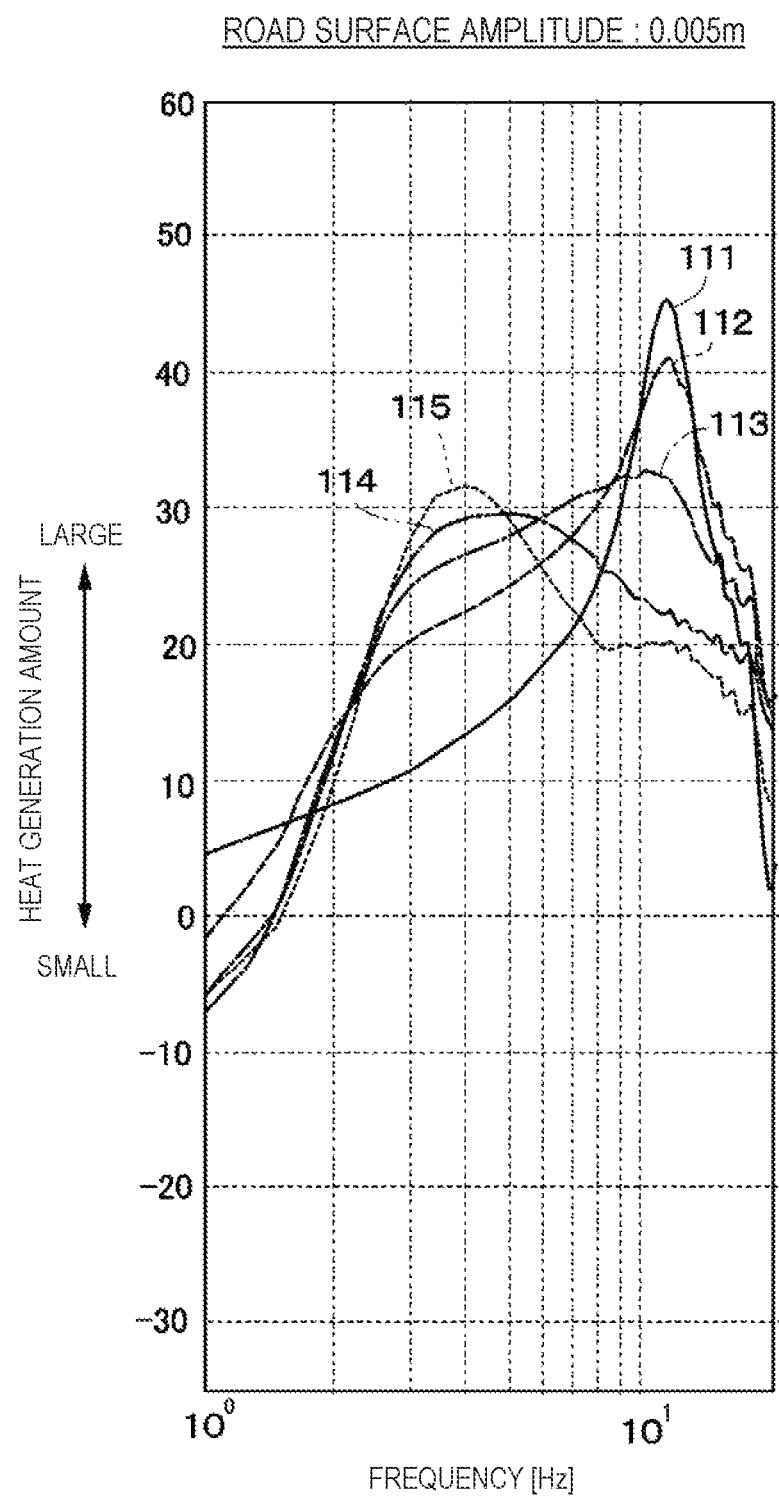
FIG. 15 is a characteristic line diagram for showing a relationship between the vibration frequency and the damper heat generation amount at the time when the road surface amplitude is increased from the road surface amplitude of FIG. 14.

FIG. 15 shows a case in which, for example, the road surface amplitude is 0.005 m. A characteristic line 111 indicated by the solid line indicates a case in which the voltage value is, for example, 0 kV, and the damping force of the electrorheological damper 6 is set to the soft characteristic. A characteristic line 112 indicated by the broken line of FIG. 15 indicates a case in which the voltage value is, for example, 1.25 kV, and the damping force of the electrorheological damper 6 is increased from that set to the soft characteristic. A characteristic line 113 indicated by the one-dot chain line of FIG. 15 indicates a case in which the voltage value is, for example, 2.5 kV, and the damping force of the electrorheological damper 6 is set to the medium characteristic. A characteristic line 114 indicated by the two-dot chain line of FIG. 15 indicates a case in which the voltage value is, for example, 3.75 kV, and the damping force of the electrorheological damper 6 is reduced from that set to the hard characteristic. A characteristic line 115 indicated by the dotted line of FIG. 15 indicates a case in which the voltage value is, for example, 5 kV, and the damping force of the electrorheological damper 6 is set to the hard characteristic.

Figure 16:
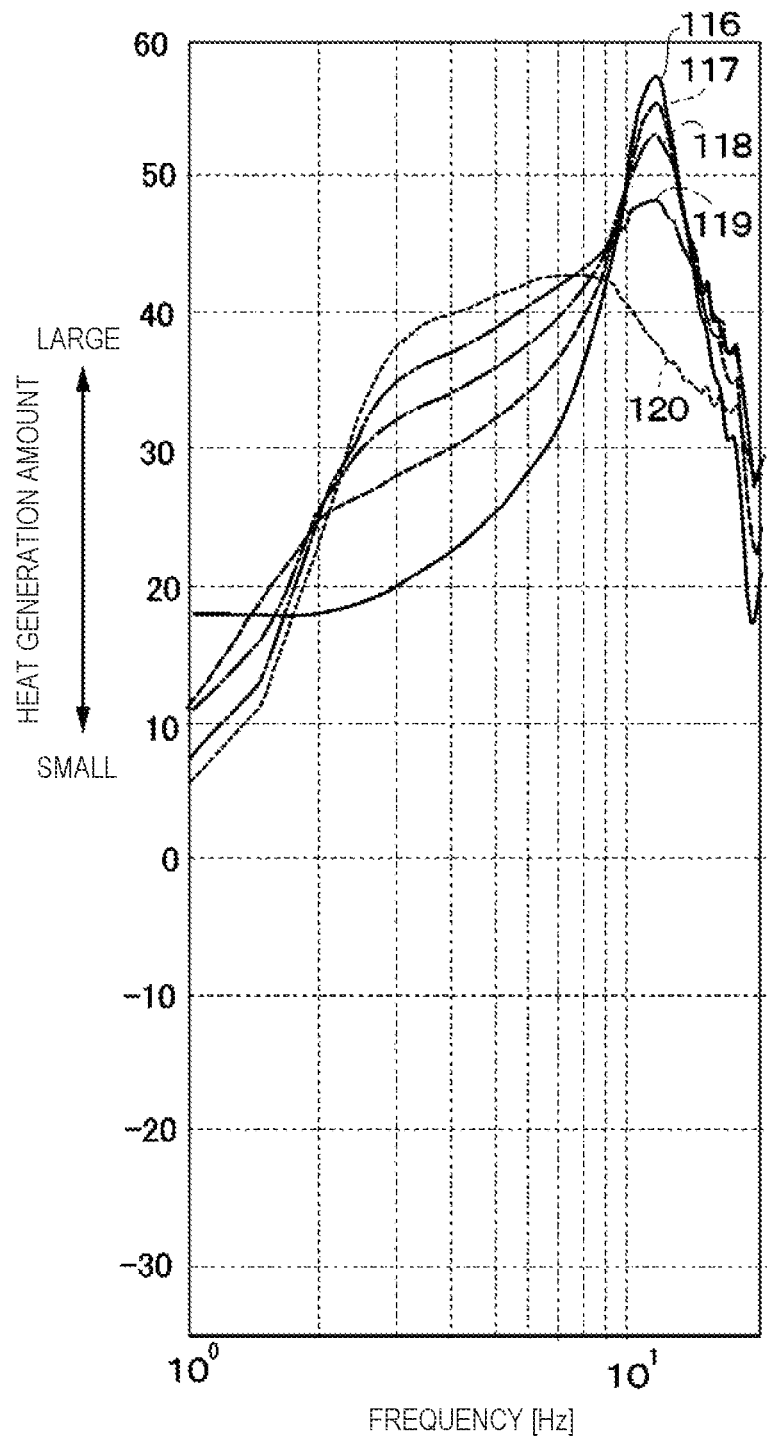
FIG. 16 is a characteristic line diagram for showing a relationship between the vibration frequency and the damper heat generation amount at the time when the road surface amplitude is increased from the road surface amplitude of FIG. 15.

FIG. 16 shows a case in which, for example, the road surface amplitude is 0.01 m. A characteristic line 116 indicated by the solid line indicates a case in which the voltage value is, for example, 0 kV, and the damping force of the electrorheological damper 6 is set to the soft characteristic. A characteristic line 117 indicated by the broken line of FIG. 16 indicates a case in which the voltage value is, for example, 1.25 kV, and the damping force of the electrorheological damper 6 is increased from that set to the soft characteristic. A characteristic line 118 indicated by the one-dot chain line of FIG. 16 indicates a case in which the voltage value is, for example, 2.5 kV, and the damping force of the electrorheological damper 6 is set to the medium characteristic. A characteristic line 119 indicated by the two-dot chain line of FIG. 16 indicates a case in which the voltage value is, for example, 3.75 kV, and the damping force of the electrorheological damper 6 is reduced from that set to the hard characteristic. A characteristic line 120 indicated by the dotted line of FIG. 16 indicates a case in which the voltage value is, for example, 5 kV, and the damping force of the electrorheological damper 6 is set to the hard characteristic.

From the characteristic lines 101 to 120 of FIG. 13 to FIG. 16, it is recognized how the heat generation amount of the damper changes in accordance with the damping force characteristic of the electrorheological damper 6. Moreover, the heat generation amount changes in accordance with the road surface amplitude and the frequency during the travel, and hence it was able to be confirmed that it is effective to switch the voltage value of the high voltage command output from the control command management unit 93 to the high voltage driver 17 in a range of, for example, from 0 kV to 5 kV based on the road surface state in accordance with the case in which the electrorheological damper 6 is required to generate heat and the case in which the electrorheological damper 6 is not required to generate heat.

Moreover, the heat generation amount Q of the electrorheological damper 6 is obtained by multiplying the damping force F and the piston speed V of the electrorheological damper 6 by each other as given by Expression (2). In the semi-active damper (electrorheological damper 6), the damping force F can be controlled. Accordingly, the heat generation amount Q can efficiently be controlled by switching the damping force F in real time in accordance with the piston speed V.

Moreover, the piston speed V is likely to become faster in a case of sprung resonance or unsprung resonance. The frequency of the piston behavior is analyzed, and when the vibration level of the resonance frequency is high, the damping force is particularly reduced, to thereby be able to urge the generation of the piston speed and facilitate the heat generation.

Moreover, in order to facilitate the generation and the increase of the piston speed V, when the absolute value of the piston speed V is increasing, the damping force is set to the soft characteristic. When the absolute value of the piston speed V is decreasing, the damping force is set to the hard characteristic. Also with this configuration, the heat generation amount Q of the damper can efficiently be controlled.

In each embodiment, description has been given of the example in which the electrorheological fluid (ERF 10) is used as the functional fluid. However, the present invention is not limited to this example, and, for example, magneto-rheological fluid may be used as the functional fluid, and the functional fluid having a characteristic to be changed in accordance with a magnetic field may be sealingly contained in the cylinder of the damping force adjustable shock absorber.

Moreover, in each embodiment, description has been given of the example in which the electrorheological damper 6 of the suspension device 4 is mounted in a vertically oriented state to the vehicle, for example, a four-wheeled vehicle. However, the present invention is not limited to this example, the damping force adjustable shock absorber may be mounted to the vehicle in a horizontally oriented state, for example, as in a railway train. Further, the damping force adjustable shock absorber, for example, the electrorheological damper 6, may be arranged in a desired direction in accordance with an object to which the damping force adjustable shock absorber is mounted, for example, may be arranged in a tilted direction in a range in which aeration does not occur.

Yet further, in each embodiment, description has been given of the example in which the voltage to be boosted by the high voltage driver 17 is an DC voltage. However, the present invention is not limited to this example, and the voltage to be boosted by the high voltage driver 17 may be an AC voltage. Moreover, the temperature estimation units 28, 51, 61, and 85 may be attached to, for example, the high voltage driver 17.

As the suspension control apparatus according to the embodiments, for example, a suspension control apparatus according to the following aspects are conceivable.

As a first aspect, there is provided a suspension control apparatus including: a vehicle behavior detection unit configured to detect a behavior of a vehicle; a damping force adjustable shock absorber provided between two members of the vehicle, the two members being configured to move relative to each other; and a controller configured to execute control so as to adjust a damping force of the damping force adjustable shock absorber based on a detection result obtained by the vehicle behavior detection unit, wherein the damping force adjustable shock absorber includes: a cylinder which sealingly contains functional fluid having a fluid property to be changed by an electric field or a magnetic field; a piston which is inserted into the cylinder so as to be slidable; a piston rod which is coupled to the piston, and extends to an outside of the cylinder; and an electrode which is provided in a portion at which a flow of the functional fluid is generated by the slide of the piston in the cylinder, and is configured to apply the electric field or the magnetic field to the functional fluid, and wherein the controller includes: a target voltage value setting unit configured to obtain a target voltage value to be applied to the electrode based on the detection result obtained by the vehicle behavior detection unit; a temperature estimation unit configured to detect or estimate temperature of the functional fluid; and a target voltage value correction unit configured to change the target voltage value so that a piston speed is adjusted based on a value obtained by the temperature estimation unit.

As a second aspect, in the first aspect, when the temperature of the functional fluid is lower than a predetermined value, the target voltage value is corrected to be decreased so that the piston speed is increased. Further, as a third aspect, in the first or second aspect, when the temperature of the functional fluid is higher than a predetermined value, the target voltage value is corrected to be increased so that the piston speed is decreased.

As a fourth aspect, in any one of the first to third aspects, a travel speed of the vehicle is limited when the temperature of the functional fluid has increased. As a fifth aspect, in any one of the first to fourth aspects, the damping force is set so as to have a soft characteristic during an increase in absolute value of the piston speed, and the damping force is set so as to have a hard characteristic during a decrease in absolute value of the piston speed, the damping force set to have the hard characteristic being larger than the damping force set to have the soft characteristic. As a sixth aspect, in any one of the first to fifth aspects, the damping force is reduced when a vibration level of each of a sprung resonance frequency and an unsprung resonance frequency is high. As a seventh aspect, in any one of the first to sixth aspects, the functional fluid is electrorheological fluid that has a degree of viscosity adjustable by a voltage.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims priority from Japanese Patent Application No. 2018-178769 filed on Sep. 25, 2018. The entire disclosure including Specification, Scope of Claims, Drawings, and Abstract of Japanese Patent Application No. 2018-178769 filed on Sep. 25, 2018 is incorporated herein in its entirety by reference.

REFERENCE SIGNS LIST

1 vehicle body (one of members of vehicle which are configured to move relative to each other), 2 wheel (another one of members of vehicle which are configured to move relative to each other), 6 electrorheological damper (damping force adjustable shock absorber), 7 sprung acceleration sensor (vehicle behavior detection unit), 8 unsprung acceleration sensor (vehicle behavior detection unit), 9 external air temperature sensor, 10 ERF (electrorheological fluid, functional fluid), 11 inner tube (cylinder), 12 outer tube (cylinder), 13 piston, 14 piston rod, 15 electrode tube (electrode), 17 high voltage driver, 21 controller, 27 damping force command calculation unit (target voltage value setting unit), 28, 51, 61, 85 temperature estimation unit (temperature estimation unit), 29 output limiting unit (target voltage value correction unit), V piston speed

The invention claimed is:

1. A suspension control apparatus, comprising:
    a vehicle behavior detection unit configured to detect a behavior of a vehicle;
    a damping force adjustable shock absorber provided between two members of the vehicle, the two members being configured to move relative to each other; and
    a controller configured to execute control so that a damping force of the damping force adjustable shock absorber is adjusted based on a detection result obtained by the vehicle behavior detection unit,
    wherein the damping force adjustable shock absorber includes:
        a cylinder which sealingly contains functional fluid having a fluid property to be changed by an electric field or a magnetic field;
        a piston which is inserted into the cylinder to be slidable;
        a piston rod which is coupled to the piston, and extends to an outside of the cylinder; and
        an electrode which is provided in a portion at which a flow of the functional fluid is generated by the slide of the piston in the cylinder, and is configured to apply the electric field or the magnetic field to the functional fluid, and
    wherein the controller includes:
        a target voltage value setting unit configured to obtain a target voltage value to be applied to the electrode based on the detection result obtained by the vehicle behavior detection unit;
        a temperature estimation unit configured to detect or estimate temperature of the functional fluid; and
        a target voltage value correction unit configured to change the target voltage value so that a piston speed is adjusted based on a value obtained by the temperature estimation unit, and
    wherein, when the temperature of the functional fluid is lower than a predetermined value, the target voltage value is corrected to be decreased so that the piston speed is increased.

2. The suspension control apparatus according to claim 1, wherein a travel speed of the vehicle is limited when the temperature of the functional fluid has increased.

3. The suspension control apparatus according to claim 1, wherein the damping force is set so as to have a soft characteristic during an increase in absolute value of the piston speed, and the damping force is set so as to have a hard characteristic during a decrease in absolute value of the piston speed, the damping force set to have the hard characteristic being larger than the damping force set to have the soft characteristic.

4. The suspension control apparatus according to claim 1, wherein the damping force is reduced when a vibration level of each of a sprung resonance frequency and an unsprung resonance frequency is high.

5. The suspension control apparatus according to claim 1, wherein the functional fluid is electrorheological fluid that has a degree of viscosity adjustable by a voltage.

6. A suspension control apparatus, comprising:
    a vehicle behavior detection unit configured to detect a behavior of a vehicle;
    a damping force adjustable shock absorber provided between two members of the vehicle, the two members being configured to move relative to each other; and
    a controller configured to execute control so that a damping force of the damping force adjustable shock absorber is adjusted based on a detection result obtained by the vehicle behavior detection unit,
    wherein the damping force adjustable shock absorber includes:
        a cylinder which sealingly contains functional fluid having a fluid property to be changed by an electric field or a magnetic field;
        a piston which is inserted into the cylinder to be slidable;
        a piston rod which is coupled to the piston, and extends to an outside of the cylinder; and
        an electrode which is provided in a portion at which a flow of the functional fluid is generated by the slide of the piston in the cylinder, and is configured to apply the electric field or the magnetic field to the functional fluid,
    wherein the controller includes:
        a target voltage value setting unit configured to obtain a target voltage value to be applied to the electrode based on the detection result obtained by the vehicle behavior detection unit;
        a temperature estimation unit configured to detect or estimate temperature of the functional fluid; and
        a target voltage value correction unit configured to change the target voltage value so that a piston speed is adjusted based on a value obtained by the temperature estimation unit, and
    wherein, when the temperature of the functional fluid is higher than a predetermined value, the target voltage value is corrected to be increased so that the piston speed is decreased.

7. The suspension control apparatus according to claim 6, wherein a travel speed of the vehicle is limited when the temperature of the functional fluid has increased.

8. The suspension control apparatus according to claim 6, wherein the damping force is set so as to have a soft characteristic during an increase in absolute value of the piston speed, and the damping force is set so as to have a hard characteristic during a decrease in absolute value of the piston speed, the damping force set to have the hard characteristic being larger than the damping force set to have the soft characteristic.

9. The suspension control apparatus according to claim 6, wherein the damping force is reduced when a vibration level of each of a sprung resonance frequency and an unsprung resonance frequency is high.

10. The suspension control apparatus according to claim 6, wherein the functional fluid is electrorheological fluid that has a degree of viscosity adjustable by a voltage.

* * * * *